US011618158B2

(12) United States Patent
Tang et al.

(10) Patent No.: US 11,618,158 B2
(45) Date of Patent: Apr. 4, 2023

(54) CLIMBING SOFT ROBOTICS

(71) Applicant: Temple University-Of The Commonwealth System of Higher Education, Philadelphia, PA (US)

(72) Inventors: Yichao Tang, Philadelphia, PA (US); Jie Yin, Haverford, PA (US)

(73) Assignee: Temple University-Of The Commonwealth System of Higher Education, Philadelphia, PA (US)

( * ) Notice: Subject to any disclaimer, the term of this patent is extended or adjusted under 35 U.S.C. 154(b) by 683 days.

(21) Appl. No.: 16/623,393

(22) PCT Filed: Jun. 18, 2018

(86) PCT No.: PCT/US2018/038027
§ 371 (c)(1),
(2) Date: Dec. 16, 2019

(87) PCT Pub. No.: WO2018/232386
PCT Pub. Date: Dec. 20, 2018

(65) Prior Publication Data
US 2020/0156237 A1 May 21, 2020

Related U.S. Application Data

(60) Provisional application No. 62/661,771, filed on Apr. 24, 2018, provisional application No. 62/520,686, filed on Jun. 16, 2017.

(51) Int. Cl.
*G06F 17/00* (2019.01)
*B25J 9/10* (2006.01)
(Continued)

(52) U.S. Cl.
CPC .................. *B25J 9/10* (2013.01); *B25J 15/12* (2013.01); *B62D 57/02* (2013.01); *F15B 15/02* (2013.01)

(58) Field of Classification Search
CPC ..... B25J 9/10; B25J 15/12; B25J 9/142; B25J 15/0023; B62D 57/02; B62D 57/024; F15B 15/02; F15B 15/103; F15B 15/10
(Continued)

(56) References Cited

U.S. PATENT DOCUMENTS 9,464,642 B2 * 10/2016 Ilievski .................. F15B 15/10
10,233,910 B2 * 3/2019 Mazzeo .................. B25J 9/142
(Continued)

OTHER PUBLICATIONS

"Soft Robot Walking and Crawling", Youtube, (Nov. 29, 2011), URL: https://www.youtube.com/watch?v=2DsbS9cMOAE, (Aug. 22, 2018), XP054979133.
(Continued)

*Primary Examiner* — Ronnie M Mancho
(74) *Attorney, Agent, or Firm* — Riverside Law LLP

(57) ABSTRACT

The present invention relates to a new pneumatic-actuated multifunctional doming actuator. The doming actuator can be used as a doming actuator, which can maintain machine/robotic operation on vertical surfaces without falling. The doming actuators exhibit rapid switchable adhesion/deadhesion on target surfaces upon pressurizing/depressurizing the embedded spiral pneumatic channels. The present invention also relates to novel load-carrying and climbing soft robots using the doming actuators. The soft robots are operable on a wide range of horizontal and vertical surfaces including dry, wet, slippery, smooth, and semi-smooth surfaces. In addition, the doming actuators can be used as a driving actuator for swimming soft robotics and as an actuator for soft grippers.

21 Claims, 26 Drawing Sheets

(51) Int. Cl.
B25J 15/12 (2006.01)
B62D 57/02 (2006.01)
F15B 15/02 (2006.01)

(58) Field of Classification Search
USPC .................................................... 700/245
See application file for complete search history.

(56) References Cited

U.S. PATENT DOCUMENTS

| | | | | |
|---|---|---|---|---|
| 2014/0109560 | A1* | 4/2014 | Ilievski | B25J 9/1075 60/484 |
| 2015/0217459 | A1* | 8/2015 | Morin | B25J 18/06 74/490.01 |
| 2015/0283699 | A1* | 10/2015 | Morin | B25J 9/142 901/22 |
| 2016/0075036 | A1 | 3/2016 | Lessing | |
| 2017/0097021 | A1* | 4/2017 | Ilievski | B25J 9/1075 |
| 2017/0239821 | A1* | 8/2017 | Lessing | B25J 13/088 |
| 2018/0363683 | A1* | 12/2018 | Shepherd | B25J 9/1075 |

OTHER PUBLICATIONS

Ainla A et al., Soft robotics, 2017, 4(3):297-304.
Aksak B et al., Robotics and Automation, 6 pages, 2008.
Autumn K et al., Nature, 2000, 405(6787):681.
Balaguer C et al., Autonomous Robots, 2005, 18(2):157-169.
Bartlett NW et al., Science, 2015, 349(6244):161-165.
Boxerbaum AS et al., The international journal of Robotics Research, 2012, 31(3):302-318.
Briggs GAD et al., Journal of Physics D: Applied Physics, 1977, 10(18):2453.
Brinkmeyer A et al., International Journal of Solids and Structures, 2012, 49(9):1077-1087.
Calisti M et al., Bioinspiration & biomimetics, 2015, 10(4):046012.
Cianchetti M et al., Bioinspiration & biomimetics, 2015, 10(3):035003.
Feng, Xue, et al., Journal of Mechanics of Materials and Structures 1.6 (2006): 1041-1053.
Freund LB et al., Applied Physics Letters, 1999, 74(14):1987-1989.
Freund LB, Journal of the Mechanics and Physics of Solids, 2000, 48(6-7):1159-1174.
Fuller KNG et al., Journal of Physics D: Applied Physics, 1981, 14(2):221.
Galloway KC et al., Soft robotics, 2016, 3(1):23-33.
Gemmell BJ et al., Proceedings of the National Academy of Sciences, 2013, 110(44):17904-17909.
Gladman AS et al., Nature materials, 2016, 15(4):413.
Glick P et al., IEEE Robotics and Automation Letters, 9 pages, 2018.
Godaba H et al., IEEE Robotics and Automation Letters, 2016, 1(2):624-631.
Harnettlab, "Telescoping Actuator", YouTube, (Aug. 22, 2013), URL: https://www.youtube.com/watch?v=6v3yCWo2mYw, (Aug. 22, 2018), XP054979146.
Hu W et al., Nature, 2018, 554(7690):81.
Huang Y et al., Journal of the Mechanics and Physics of Solids, 2005, 53(11):2483-2500.
Jayaram K et al., Proceedings of the National Academy of Sciences, 2016, 113(8):E950-E957.
Kier WM et al., Integrative and Comparative Biology, 2002, 42(6):1146-1153.
Kim S et al., IEEE Transactions on robotics, 2008, 24(1):65-74.
Kumar K et al., Soft robotics, 2017, 4(4):317-323.
Laschi C et al., Sci. Robot., 2016, 1(1):eaah3690.
Lee H et al., Advanced Materials, 2016, 28(34):7457-7465.
Lin HT et al., Bioinspiration & biomimetics, 2011, 6(2):026007.
Marchese AD et al., Soft Robotics, 2014, 1(1):75-87.
Martinez RV et al., Advanced Materials, 2013, 25(2):153-153.
Miyashita S et al., Science Robotics (2017).
Modes CD et al., Proceedings of the Royal Society of London A: Mathematical, Physical and Engineering Sciences, 2011, 467(2128).
Morin SA et al., Science, 2012, 337(6096):828-832.
Mosadegh B et al., Advanced functional materials, 2014, 24(15):2163-2170.
Nasab AM et al., Soft robotics, 2017, 4(4):411-420.
Pezzulla M et al., Soft Matter, 2016, 12(19):4435-4442.
Pikul JH et al., Science, 2017, 358(6360):210-214.
Polygerinos P et al., Rehabilitation Robotics (ICORR), 2015).
Polygerinos P et al., Robotics and Autonomous Systems, 2015, 73:135-143.
Renda F et al., Bioinspiration & biomimetics, 2015, 10(5):055005.
Rogoz M et al., Advanced Optical Materials, 2016, 4(11):1689-1694.
Sareh S et al., Journal of the Royal Society Interface, 2017, 14(135):20170395.
Seok S et al., IEEE/ASME Transactions on mechatronics, 2013, 18(5):1485-1497.
Seok S et al., Robotics and Automation (ICRA), 6 pages, 2010.
Serchi FG et al., IEEE/ASME Transactions on Mechatronics, 2013, 18(2):484-493.
Shepherd RF et al., Angewandte Chemie, 2013, 125(10):2964-2968.
Shepherd RF et al., Proceedings of the national academy of sciences, 2011, 108(51):20400-20403.
Shin B et al., Science Robotics, 2018, 3(14):eaar2629.
Shintake J et al., Intelligent Robots and Systems (IROS), 6 pages, 2016.
Sitti M et al., Robotics and Automation, 7 pages, 2003.
Smith AM et al., Journal of Experimental Biology, 1991, 157(1):257-271.
Song SH et al., Bioinspiration & biomimetics, 2016, 11(3):036010.
Tian Y et al., Proceedings of the National Academy of Sciences, 2006, 103(51):19320-19325.
Tolley MT et al., Soft robotics, 2014, 1(3):213-223.
Tramacere F et al., Interface focus, 2015, 5(1):20140050.
Villanueva A et al., Bioinspiration & biomimetics, 2011, 6(3):036004.
Wang W et al., Bioinspiration & biomimetics, 2014, 9(4):046006.
Wehner M et al., Nature, 2016, 536(7617):451.
Yang D et al., Advanced Materials Technologies, 2016, 1(3).
Yang D et al., Advanced Materials Technologies, 2017, 2(1).
Yang D et al., Advanced Materials, 2015, 27(41):6323-6327.
Yap HK et al., Soft Robotics, 2016, 3(3):144-158.
Yeom SW et al., Smart materials and structures, 2009, 18(8):085002.
Yichao Tang et al, "Switchable Adhesion Actuator for Amphibious Climbing Soft Robot", Soft Robototics, vol. 5, No. 5, (Jun. 29, 2018), URL: https://www.researchgate.net/publication/324744834_Switchable_Adhesion_Actuator_for_Amphibious_Climbing_Soft_Robot, (Aug. 22, 2018), XP055556141.
Zhang H et al., IEEE Robotics & Automation Magazine, 2006, 13(1):32-41.
Zhu J et al., Journal of Intelligent and robotic Systems, 2002, 35(4):427-443.

* cited by examiner

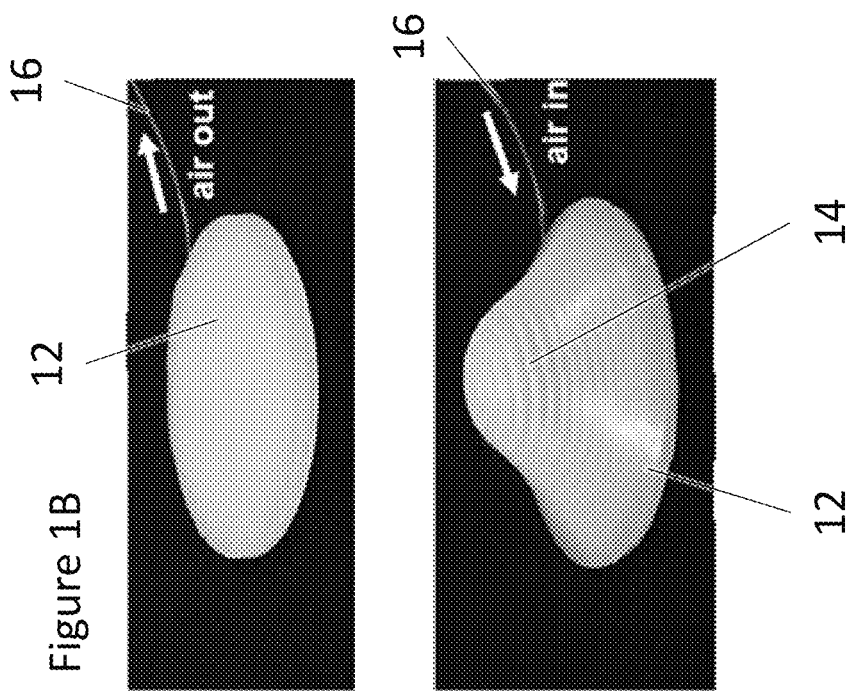
Figure 1B
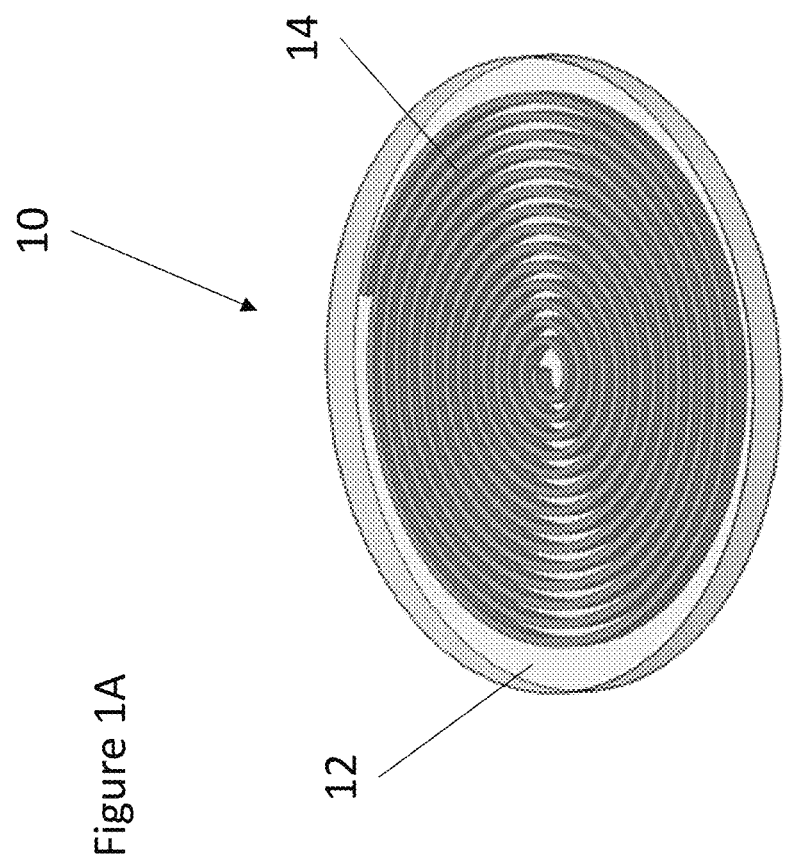
Figure 1A
Figure 1A – Figure 1B

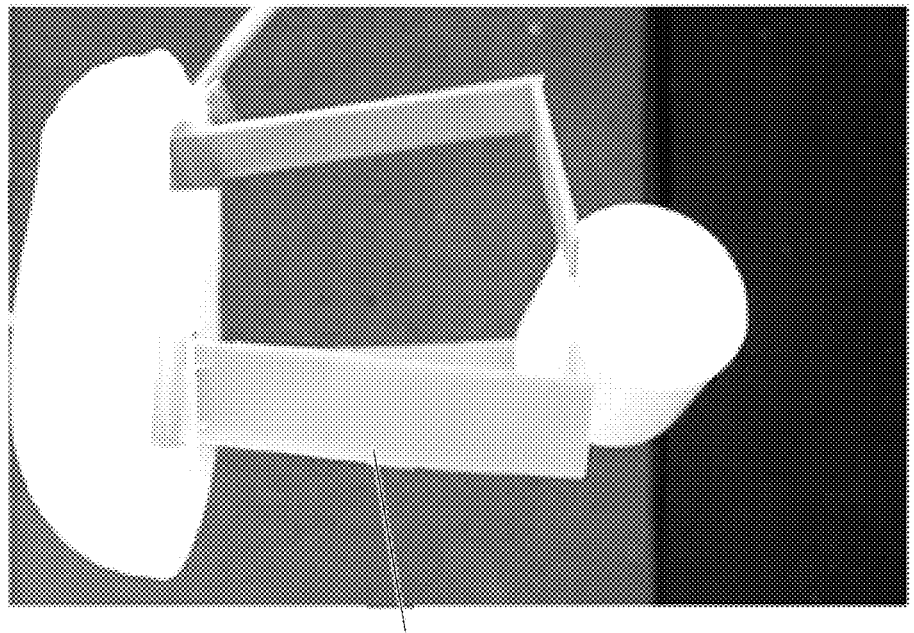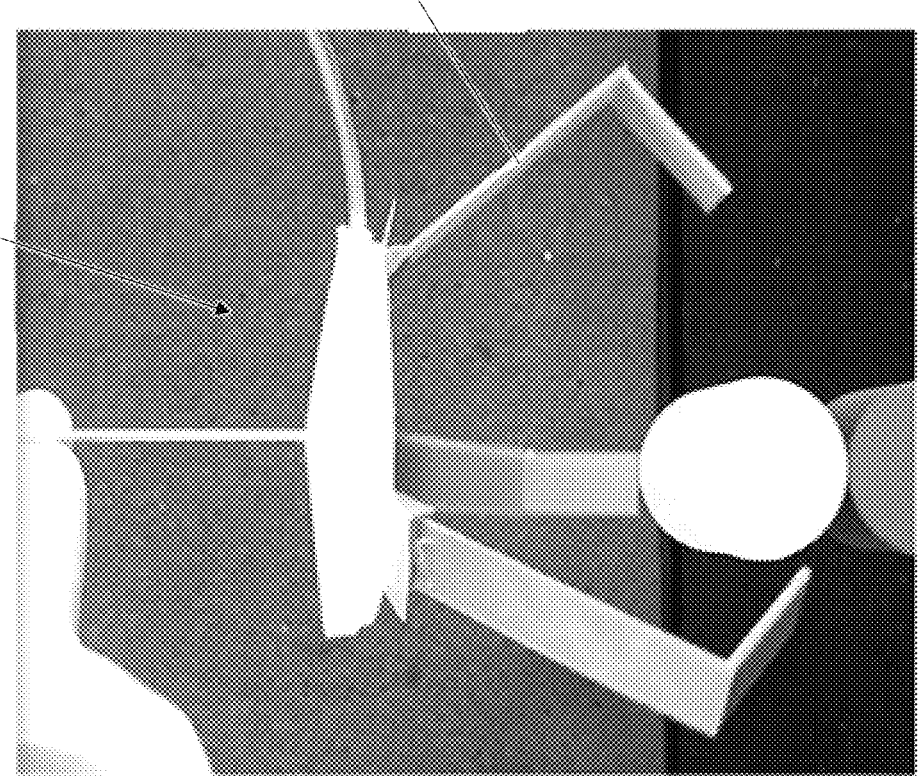

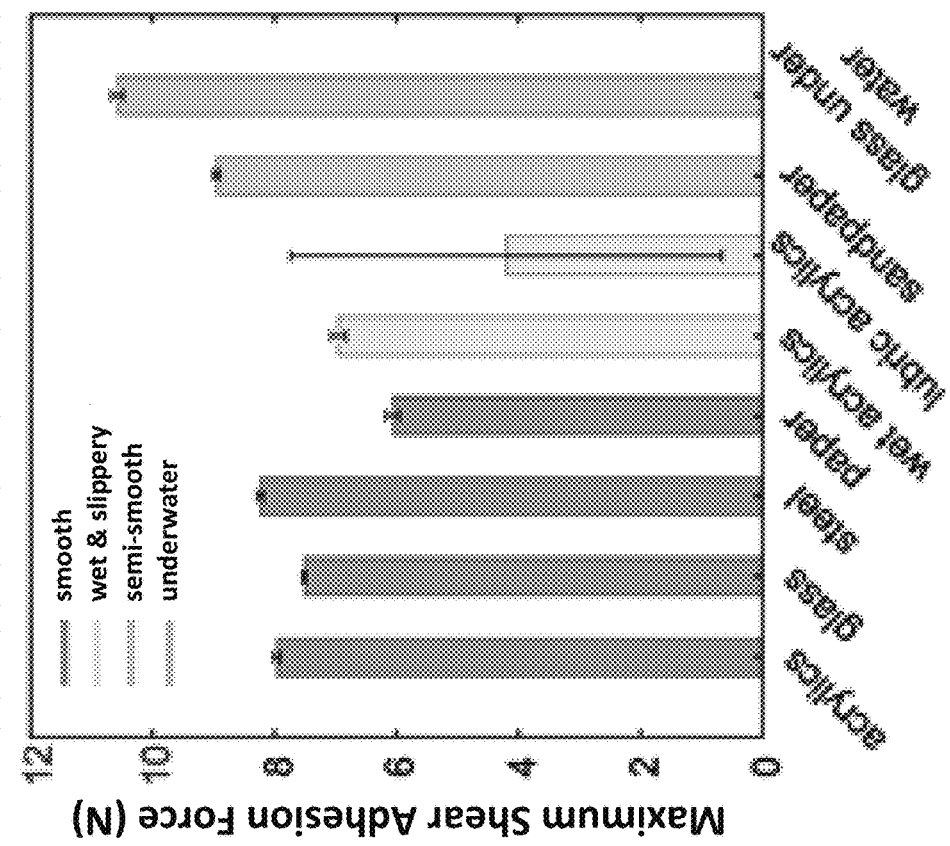
Figure 6B
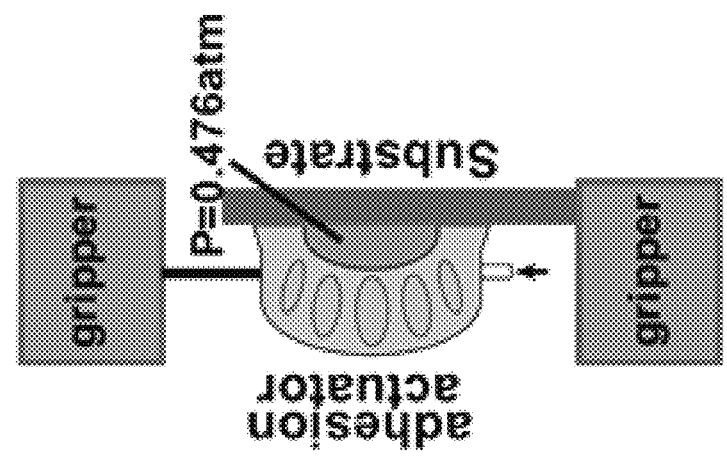
Figure 6A
Figure 6A – Figure 6B

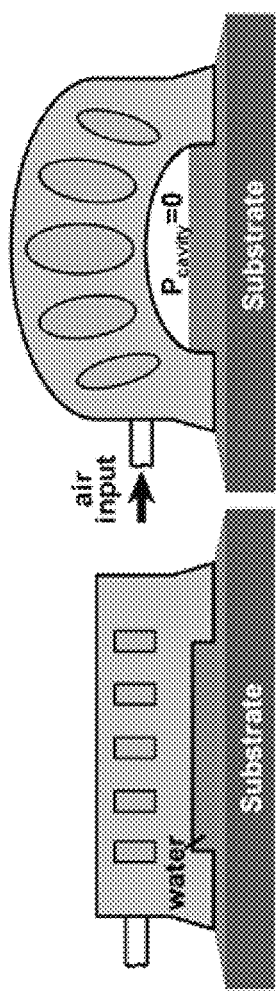
Figure 7A
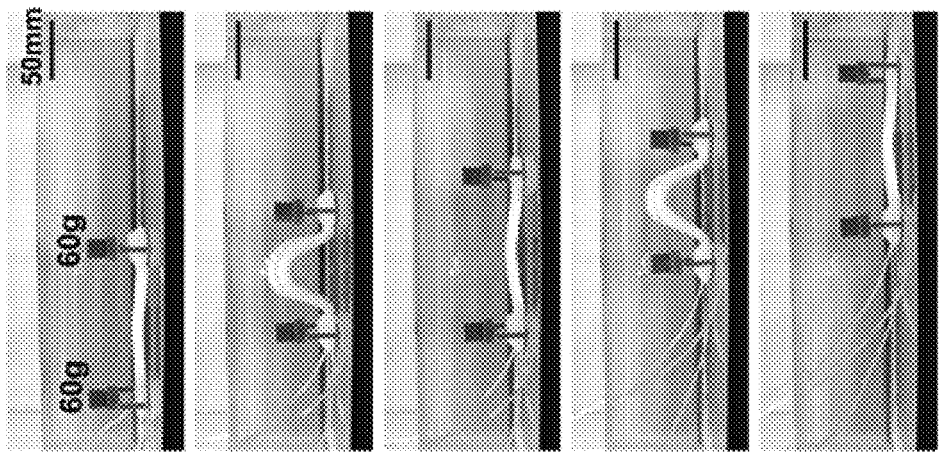
Figure 7B
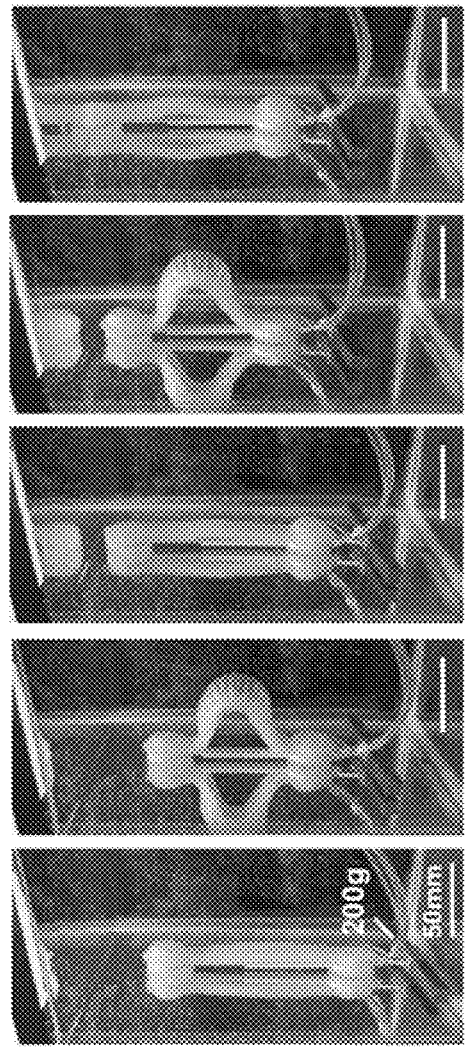
Figure 7C
Figure 7A – Figure 7C

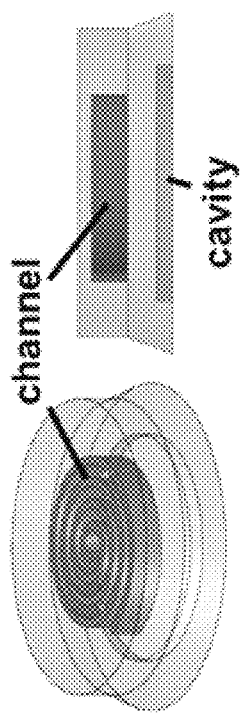
Figure 8A
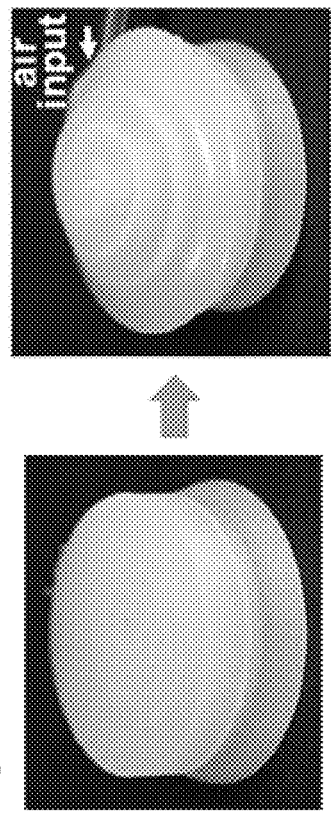
Figure 8B
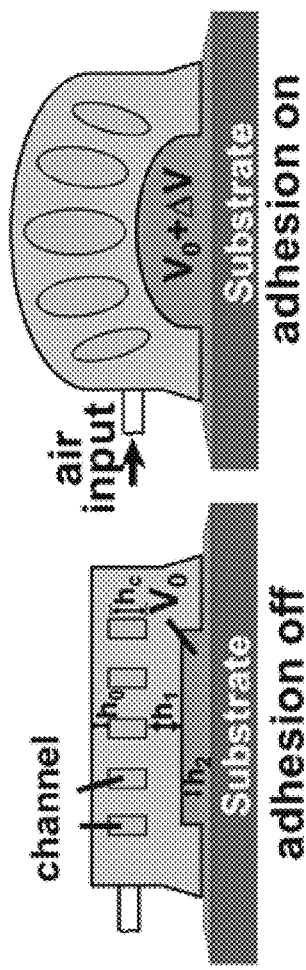
Figure 8C
Figure 8A – Figure 8C

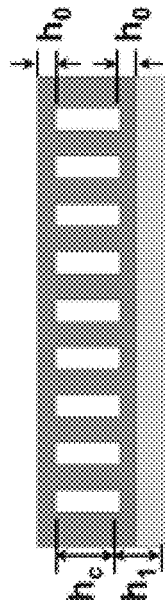
Figure 9A
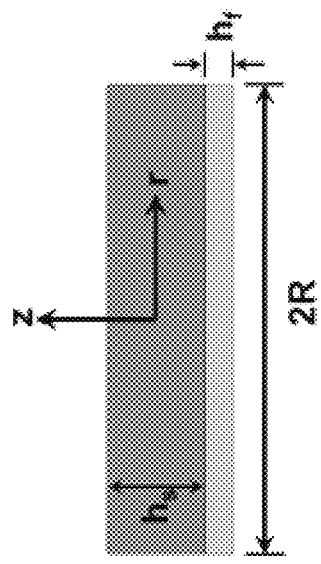
Figure 9B
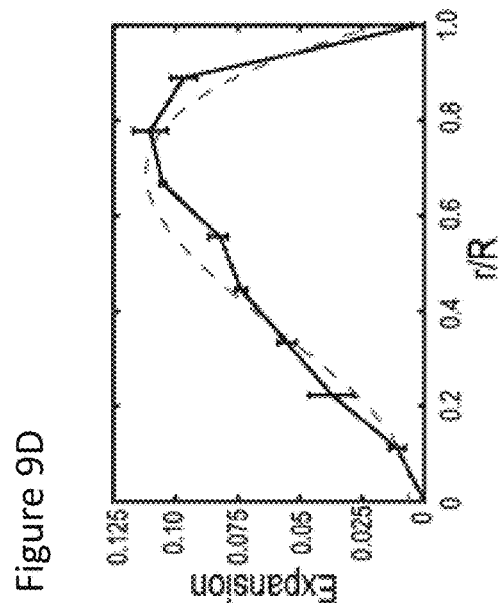
Figure 9C
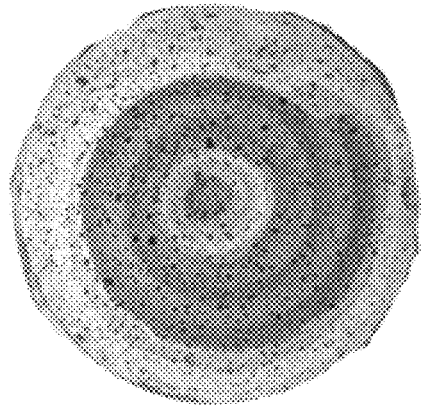
Figure 9D
Figure 9A – Figure 9D

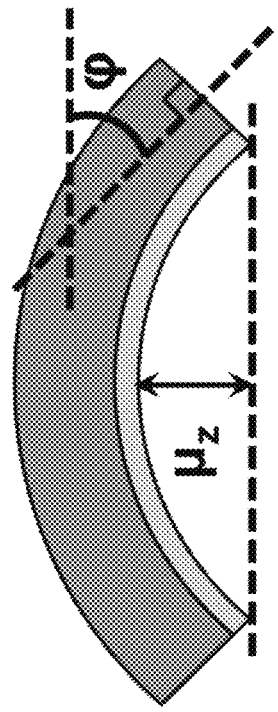
Figure 13A
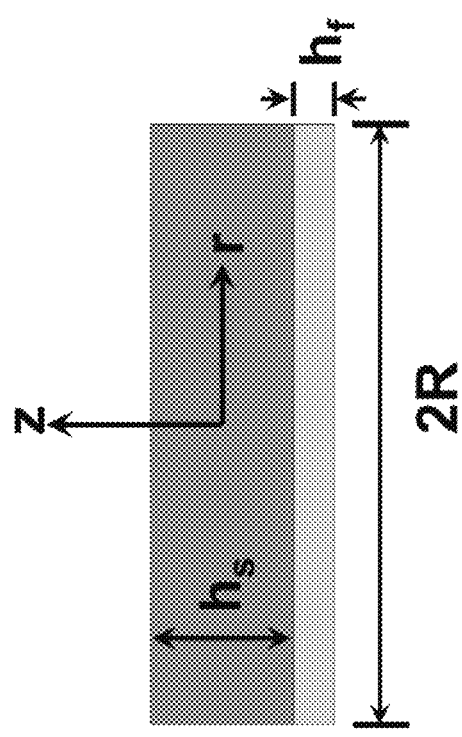
Figure 13B
Figure 13A – Figure 13B

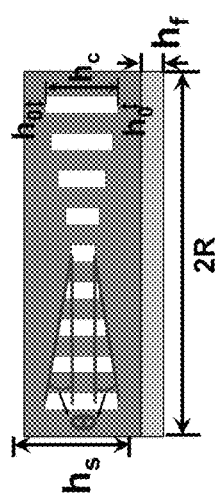
Figure 14C
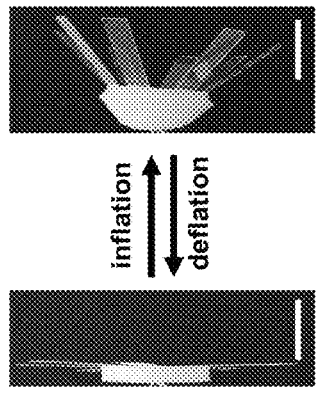
Figure 14B
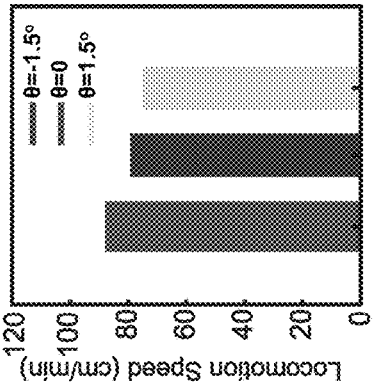
Figure 14F
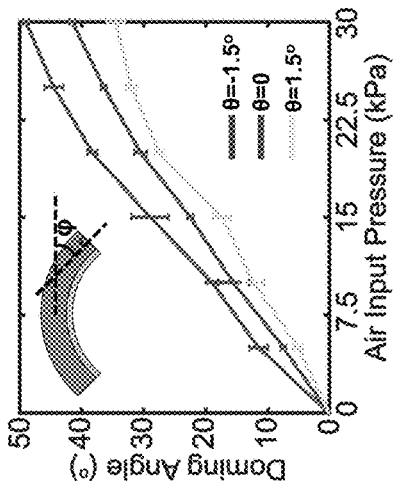
Figure 14E
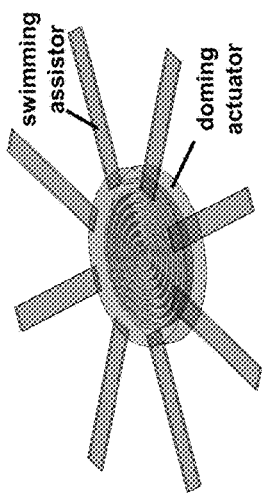
Figure 14A
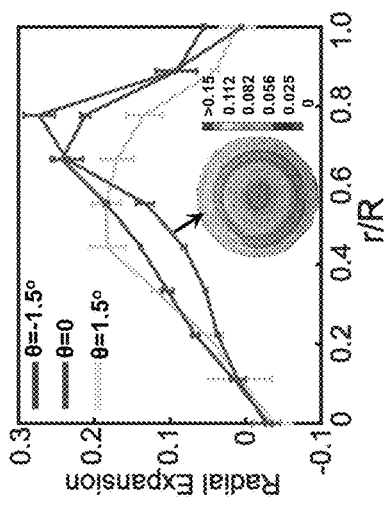
Figure 14D
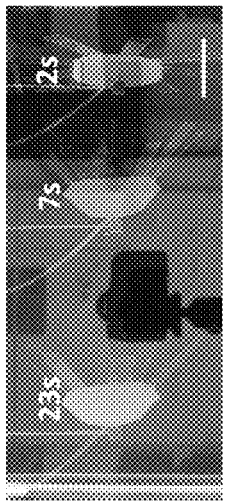
Figure 14G
Figure 14A – Figure 14G

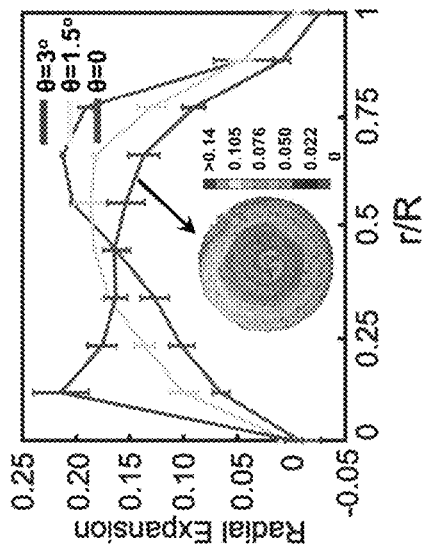
Figure 18A
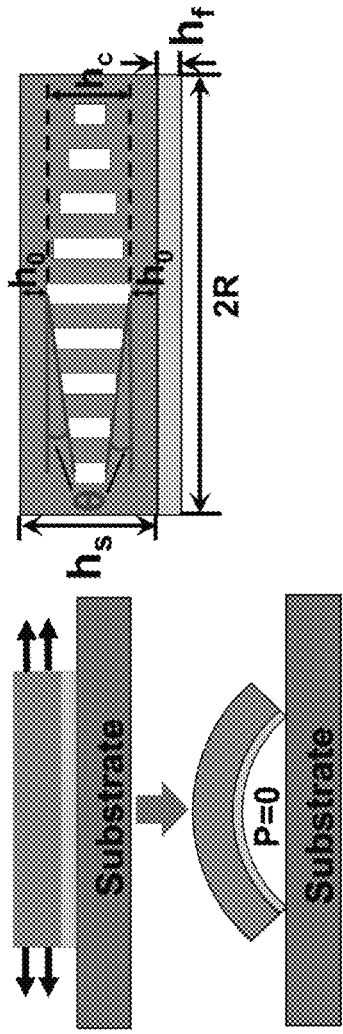
Figure 18B
Figure 18C
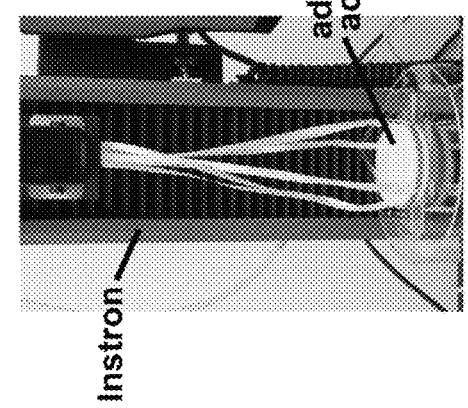
Figure 18D
Figure 18E
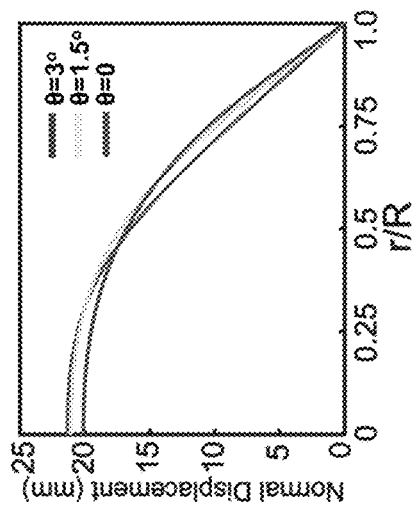
Figure 18F
Figure 18A – Figure 18F

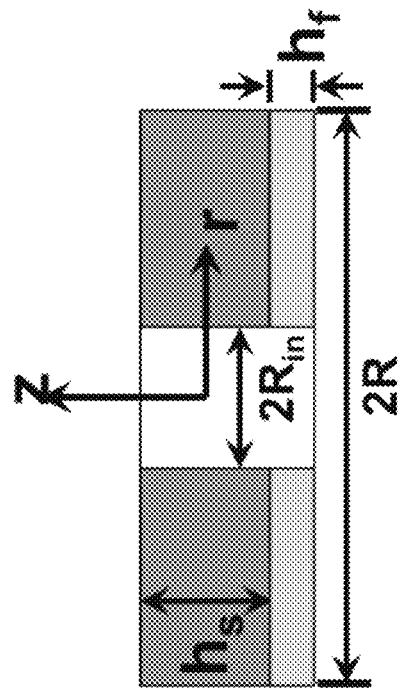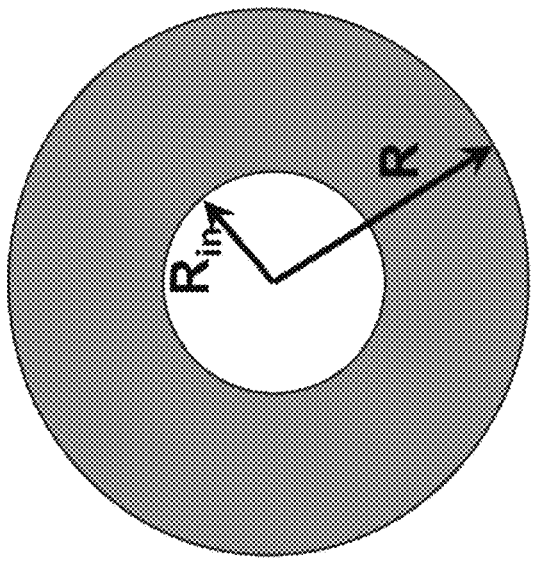
Figure 21A
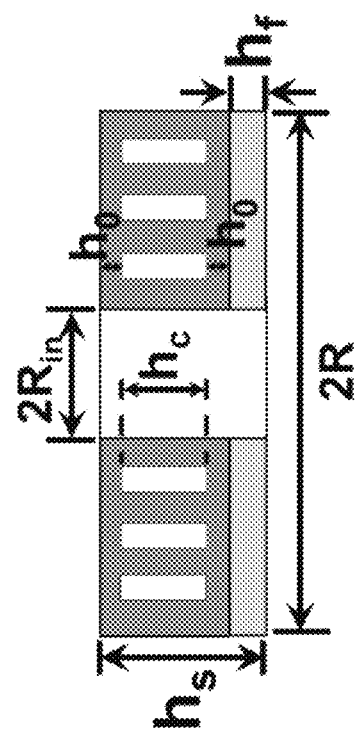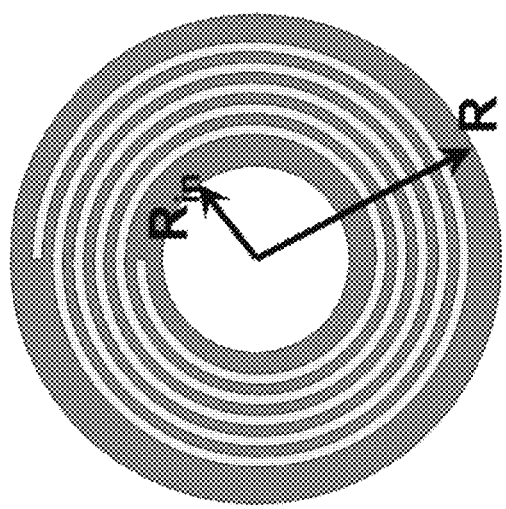
Figure 21B
Figure 21A – Figure 21B

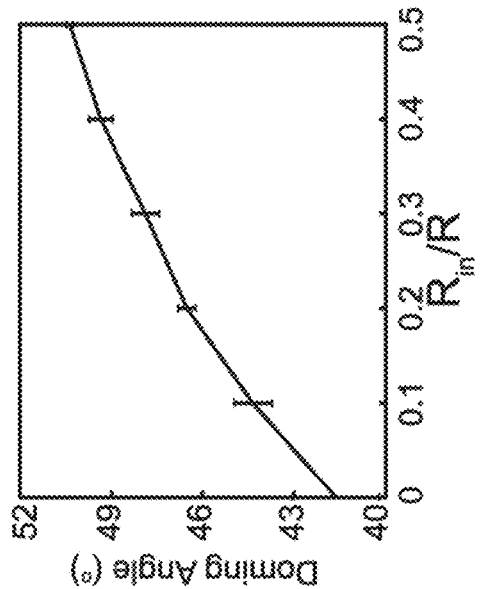
Figure 22A
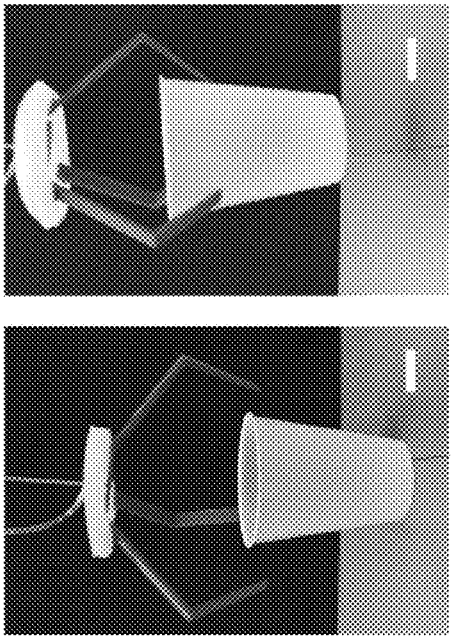
Figure 22B
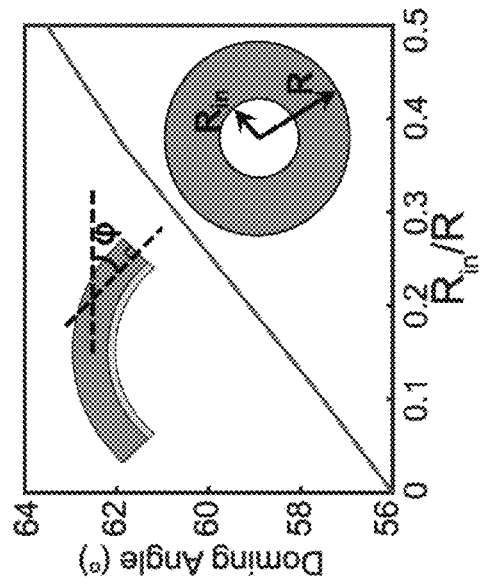
Figure 22C
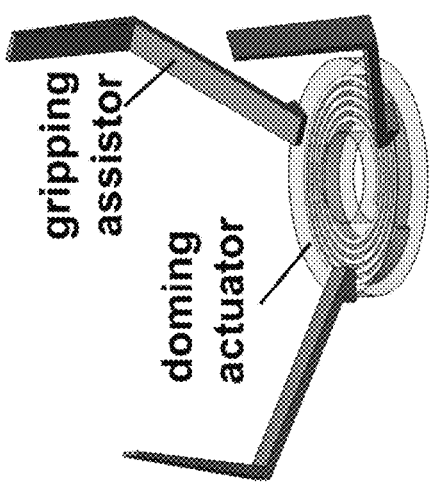
Figure 22D
Figure 22A – Figure 22D

CLIMBING SOFT ROBOTICS

CROSS-REFERENCE TO RELATED APPLICATIONS

This application is the U.S. national phase application filed under 35 U.S.C. § 371 claiming benefit to International Patent Application No. PCT/US18/38027 filed Jun. 18, 2018, which is entitled to priority under 35 U.S.C. § 119(e) to U.S. Provisional Patent Application No. 62/661,771, filed Apr. 24, 2018, and to U.S. Provisional Patent Application No. 62/520,686, filed Jun. 16, 2017, the contents of which are each incorporated by reference herein in their entirety.

BACKGROUND OF THE INVENTION

Soft robots constructed from highly deformable soft materials have attracted tremendous research interest due to their inherent compliance and durability with large deformation and their potential to interact more safely and adaptively with humans and the environment. To provide soft robots with regular robotic functions, great efforts have been dedicated to designing robust locomotive soft robotics. The achieved locomotion modes include walking, jumping, and swimming, which are mostly inspired by biological soft-bodied systems in nature such as caterpillars, worms, octopi, and fish.

The 'walking' of soft robotics on horizontal and slightly-tilted surfaces has been achieved in various ways and in many soft-bodied systems. For example, some soft robots can realize peristaltic-locomotion through controllable deformation by means of bending, expanding/contracting, and waving their soft bodies. The deformation can be actuated by pneumatic pressure, temperature, and light, depending on the constituent soft materials. However, it still remains a great challenge to design soft robots that can operate on vertical surfaces, which could largely expand the horizons of soft robotics in their potential applications in intelligent surveillance, inspection, and detection. Compared to walking soft robots on the ground, climbing soft robots need to counter gravity while performing common locomotion and thus require fast and switchable strong adhesion to easily attach and detach the targeted vertical surfaces upon actuation. Currently, there are several strategies to achieve switchable adhesion for the design of climbing robots. For example, by mimicking a gecko's feet for directional adhesion, some robots demonstrated the capability of climbing on vertical surfaces. Unfortunately, these robots cannot be truly classified as 'soft robots' since their bodies are mainly made of hard and rigid components, thus detracting from their ability to safely interact with the environment. Given their harsh working environment (e.g. high altitude), it will be more beneficial for climbing robotics to have soft bodies to greatly increase their probability of surviving a collision from falling.

There is a need for improved adhesion mechanisms for soft robotics. The present invention addresses this need.

SUMMARY OF THE INVENTION

In one aspect, the present invention relates to a doming actuator device comprising: a cylindrical enclosure comprising a top layer having a first thickness, a bottom layer having a second thickness, and a curved wall connecting the top layer to the bottom layer; and an elongate tube positioned within the cylindrical enclosure in a spiral, the elongate tube being bonded to the top layer and to the bottom layer and having an opening suitable for delivery and removal of a gas or liquid into and out of the elongate tube; wherein the first thickness is thinner than the second thickness.

In one embodiment, the elongate tube comprises a closed end and an open end, the open end being positioned at the opening of the elongate tube. In one embodiment, the open end is fluidly connected to an external source of gas or liquid. In one embodiment, the enclosure and the elongate tube are constructed from a flexible, reversibly deformable elastomer. In one embodiment, the elastomer is silicon. In one embodiment, the bottom layer comprises one or more attachments. In one embodiment, the one or more attachments are selected from the group consisting of: fins, fans, flippers, appendages, and hooks. In one embodiment, the bottom layer comprises a sealing lip forming a perimeter around a central cavity.

In another aspect, the present invention relates to a soft robot device comprising: at least one bending actuator comprising a length of material having a top layer and a bottom layer and an elongate lumen embedded within the material for at least a portion of its length, the elongate lumen having an opening suitable for delivery and removal of a gas or liquid into and out of the elongate lumen; and at least one doming actuator attached to the at least one bending actuator, each doming actuator comprising a cylindrical enclosure comprising a top layer having a first thickness, a bottom layer having a second thickness, and a curved wall connecting the top layer to the bottom layer, and an elongate tube positioned within the cylindrical enclosure in a spiral, the elongate tube being bonded to the top layer and to the bottom layer and having an opening suitable for delivery and removal of a gas or liquid into and out of the elongate tube.

In one embodiment, the elongate tubes of the at least one doming actuator each comprise a closed end and an open end, the open end being positioned at the opening of each elongate tube. In one embodiment, the open end of each of the elongate tubes is fluidly connected to a source of gas or liquid. In one embodiment, the elongate lumen is embedded in a zigzag pattern. In one embodiment, the elongate lumen comprises a closed end and an open end, the open end being positioned at the opening of the elongate lumen. In one embodiment, the open end is fluidly connected to a source of gas or liquid.

In one embodiment, the at least one bending actuator and the enclosures and elongate tubes of the at least one doming actuator are constructed from a flexible, reversibly deformable elastomer. In one embodiment, the elastomer is silicon. In one embodiment, the first thickness of the at least one doming actuator is thinner than the second thickness of the at least one doming actuator. In one embodiment, the bottom layer of the at least one doming actuator comprises a sealing lip forming a perimeter around a central cavity. In one embodiment, the top layer of the at least one doming actuator is thinner than the bottom layer of the at least one bending actuator. In one embodiment, the bottom layer of the at least one bending actuator is bonded to a layer of flexible and non-stretchable material. In one embodiment, the device further comprises two interlocking sliding members, each of the two interlocking sliding members connecting two doming actuators.

BRIEF DESCRIPTION OF THE DRAWINGS

The following detailed description of embodiments of the invention will be better understood when read in conjunction with the appended drawings. It should be understood, however, that the invention is not limited to the precise arrangements and instrumentalities of the embodiments shown in the drawings.

FIG. 1A and FIG. 1B depict an exemplary dome-shape pneumatic actuator. FIG. 1A is a schematic of an exemplary dome-shape actuator constructed from a soft thin cylinder with an embedded spiral-shape pneumatic channel. FIG. 1B shows the actuator deforming into a dome-shape upon pressurization (air in), and recovering to a flat state upon depressurization (air out).

FIG. 3A and FIG. 3B depict an exemplary soft actuator gripper (FIG. 3A) without actuation and (FIG. 3B) upon actuation.

FIG. 4A shows a side view and a top view of a schematic design of the CWSR structure composed of two doming actuators (two sides with embedded spiral channels) for switchable adhesion, and one bending actuator (middle with rectangular wave-like channels) for locomotion driven by pneumatic pressurization. FIG. 4B shows a fabricated CWSR from the design in FIG. 4A under a bended state upon pneumatic pressurizing the bending actuator to mimic the locomotion of an inchworm (top right inset). FIG. 4C shows a schematic of the mechanism for switchable adhesion in the doming actuator upon pneumatic pressurization with hi>ho. Left: adhesion off state; Right: adhesion on state. FIG. 4D is a demonstration of the CWSR walking mode on ground carrying loads through 5 sequential steps of actuating the 3 actuators. In the bottom left inset, green color indicates that the actuator is on and grey color indicates that the actuation is off.

FIG. 6A through FIG. 6D depict the characterization and demonstration of vertical climbing of CWSR on different substrates with carried load.

FIG. 6A shows a schematic of shear adhesion test of the doming actuator. FIG. 6B is a summarization of the measured maximum shear adhesion force generated by the doming actuator upon the same pressurization on different types of substrates. FIG. 6C and FIG. 6D demonstrate the CWSR's vertical climbing on smooth acrylics plate flushed with running water and semi-smooth sandpaper with a carried load, respectively.

FIG. 7A through FIG. 7C depict demonstrations of an exemplary CWSR's capability for underwater climbing and walking on glass. FIG. 7A is a schematic of switchable adhesion mechanism under water. Dark blue color in the cavity denotes water. Left: adhesion-off state; Right: adhesion-on state with pneumatic pressurization in the spiral channels. FIG. 7B shows CWSR walking underwater on a smooth glass. FIG. 7C shows CWSR climbing a vertical glass wall underwater with a carried load.

FIG. 8A through FIG. 8C depict the design of soft doming actuators. (FIG. 8A) Schematic design of the bilayer doming actuator with embedded spiral-shape pneumatic channel on the top and a cylindrical chamber or cavity underneath. (FIG. 8B) The as-fabricated doming actuator (left) deforms into a dome-shape upon pressurization in the air channel (right). (FIG. 8C) Schematic of the mechanism for switchable adhesion in the doming actuator upon pneumatic pressurization. Left: adhesion-off state, Right: adhesion-on state FIG. 9A depicts a schematic of continuum thin film/substrate bilayer system with misfit strain for deforming into a doming shape. FIG. 9B depicts a schematic of the proposed bilayer doming model with pneumatic spiral channel. FIG. 9C depicts a DIC test of the channeled layer (indicated by blue in (FIG. 9B)) upon 4 mL inflation shows the radial strain contour. FIG. 9D depicts the measured expansion rate of the top layer along the radial direction.

(FIG. 12A) Schematic of the circular bilayer doming actuator with embedded spiral-shape pneumatic channel on top and solid strain-limiting layer on bottom. (FIG. 12B) The as-fabricated doming actuator deforms into a dome-shape upon pressurization in the air channel. (FIG. 12C through FIG. 12E) Demonstration of soft doming actuators-based soft robots with capabilities of (FIG. 12C) swimming, (FIG. 12D) adhesion, and (FIG. 12E) grasping. The scale bar is 20 mm.

FIG. 13A and FIG. 13B depict schematics of the geometry of simplified homogenized circular bilayer systems before (FIG. 13A) and after actuation (FIG. 13B). The top layer denotes the expansion layer and the bottom one represents the strain limiting layer.

FIG. 14A through FIG. 14G depict the design of jellyfish-inspired swimming soft robot based on the bilayer doming actuator. (FIG. 14A) Schematic design of swimming robot composed of a doming actuator (with spiral pneumatic channel) and polymeric swimming assistors (green) around the edge. (FIG. 14B) Locomotion modes of the proposed soft robot at rest state (left) and upon actuation (right). (FIG. 14C) Schematic illustration of bilayer doming model with spiral channel height gradient of θ along the radial direction. (FIG. 14D) DIC measured radial expansion rate of the actuators with θ=−1.5°, θ=0° and θ=1.5° upon pressurization of 5 kPa. The inset shows the radial strain contour in the actuator with θ=−1.5°. (FIG. 14E) The measured doming angle at the edge as a function of air input pressure for doming actuators with θ=−1.5°, θ=0° and θ=1.5°. (FIG. 14F) Comparison in swimming velocity of proposed swimming robots with θ=−1.5°, θ=0° and θ=1.5°. (FIG. 14G) Demonstration of the underwater locomotion of the proposed swimming robot at different actuation time. The scale bar is 50 mm.

The solid lines denote the DIC measurements (FIG. 14D) and the dashed lines represent the fitted curves.

The equation of fitted curve for θ=1.5° is:

$$\varepsilon_m(r) = \begin{cases} 0.0105r, & r \le 0.5R \\ -0.0105r + 0.4, & r > 0.5R \end{cases}$$

The equation of fitted curve for θ=0° is:

$$\varepsilon_m(r) = \begin{cases} 0.00752r, & r \le 0.7R \\ -0.0175r + 0.667, & r > 0.7R \end{cases}$$

The equation of fitted curve for θ=−1.5° is:

$$\varepsilon_m(r) = \begin{cases} 0.00619r, & r \le 0.85R \\ -0.0351r + 1.333, & r > 0.85R \end{cases}$$

Figure 16:
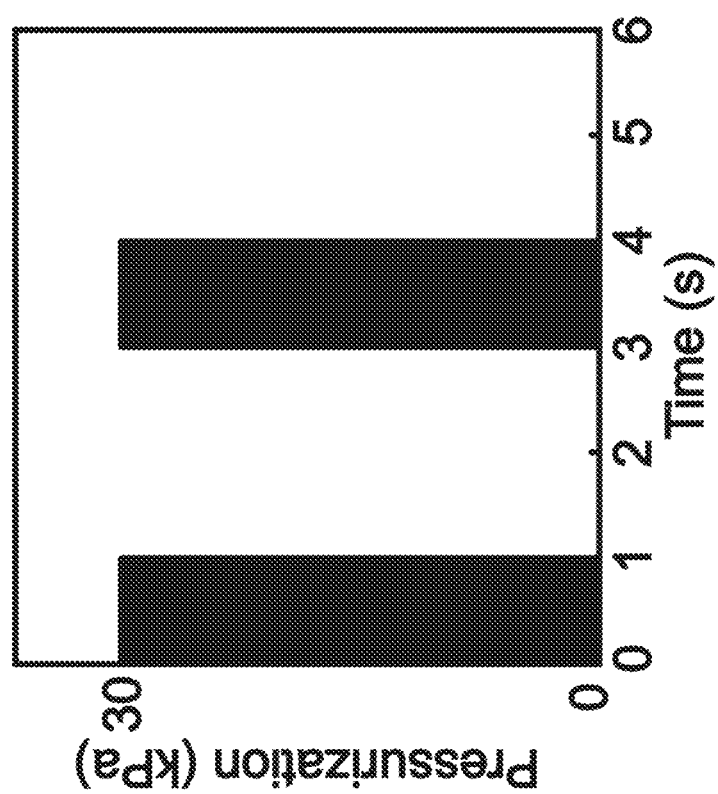

FIG. 16 is a graph depicting the actuation timing control pattern for the proposed swimming robot.

Figure 17:
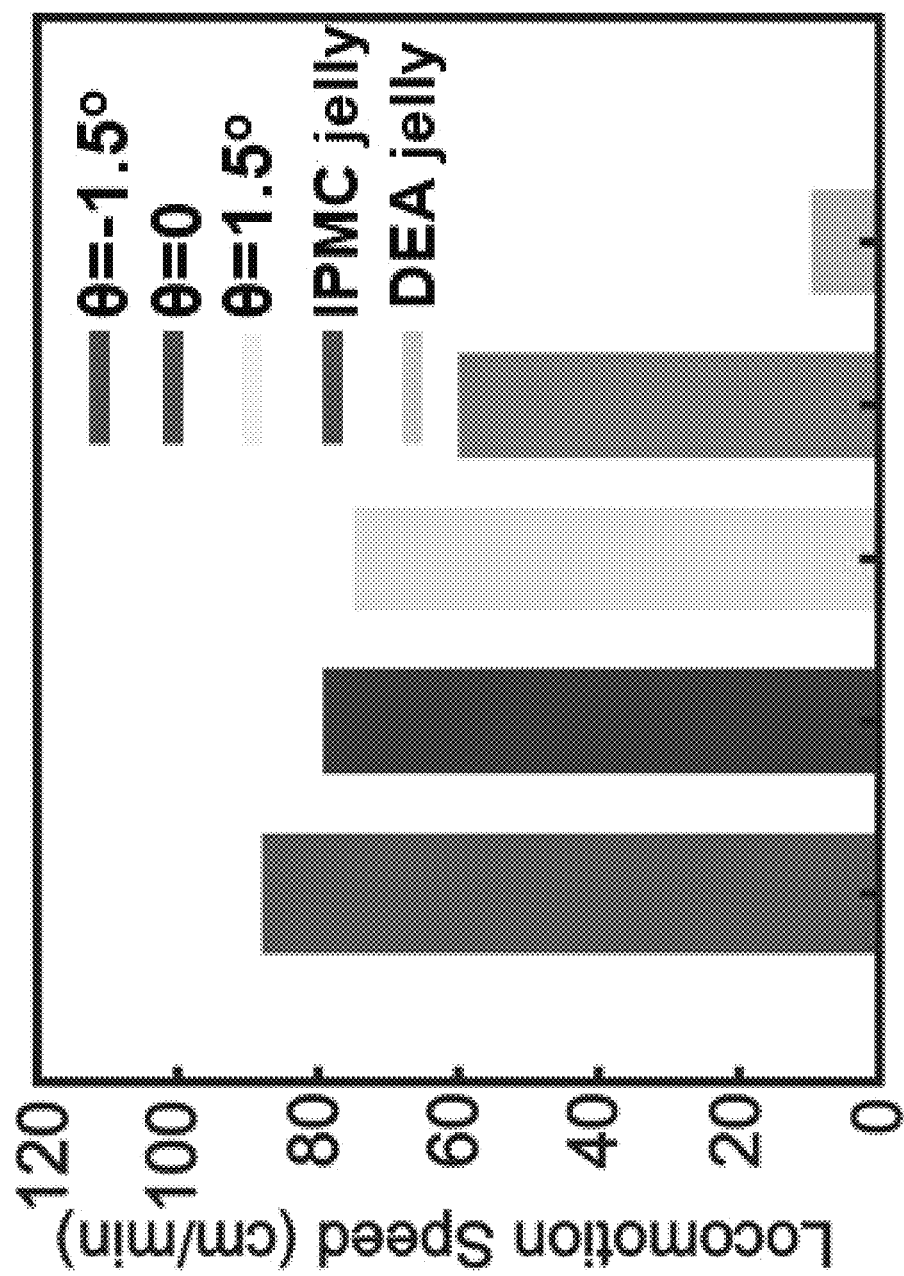

FIG. 17 is a graph comparing swimming velocity of proposed swimming robots (θ=−1.5°, θ=0° and θ=1.5°) with bending based jellyfish-inspired swimming machines made of ionic polymer metal composite (IPMC) and dielectric elastomer actuator (DEA).

FIG. 18A through FIG. 18F depict the design of bilayer doming-based soft doming actuator. (FIG. 18A) Schematic of the mechanism for switchable adhesion in the bilayer doming system upon expanding the top layer (top: adhesion-off state, bottom: adhesion-on state). (FIG. 18B) Schematic of the proposed bilayer doming model with pneumatic spiral channels in positive height gradient θ. (FIG. 18C) DIC measured radial expansion rate of the actuators with θ=0°, θ=1.5°, and θ=3° upon pressurization of 5 kPa. The inset shows the radial strain contour in the actuator with θ=3°. (FIG. 18D) Theoretically predicted profiles of doming actuators with θ=0°, θ=1.5°, and θ=3°. (FIG. 18E) Experimental set-up for measuring the pull-off force of the soft doming actuator. (FIG. 18F) The measured maximum normal adhesion force (pressurized at 40 kPa) attached to acrylic surfaces as a function of θ. Insets: collapsed asymmetric deformed shape (left) and axial symmetric deformed configuration (right).

Figure 19:
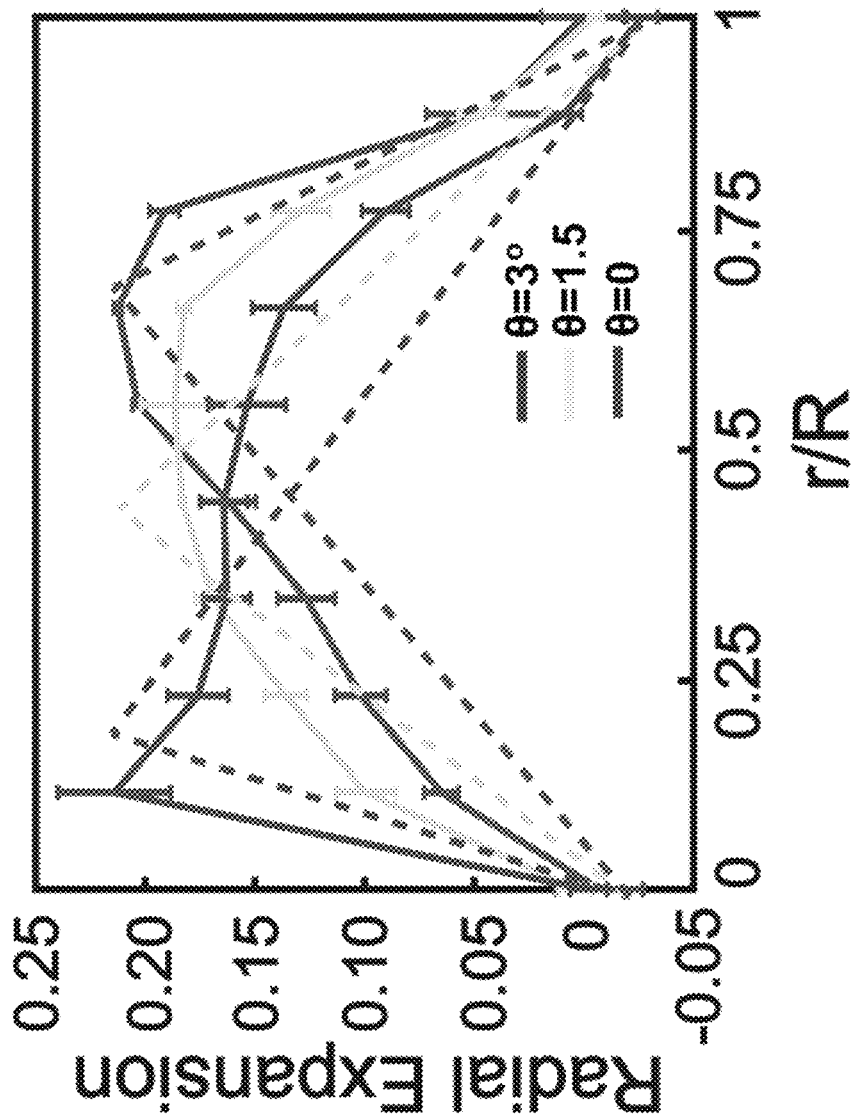

FIG. 19 depicts a graph fitting the DIC measured radial expansion rate of the top layer with channel height gradient of θ=3°, θ=1.5° and θ=0° upon 4 mL inflation. The solid lines denote the DIC measurements (FIG. 18C) and the dashed lines represent the fitted curves.

The equation of fitted curve for θ=3° is:

$$\varepsilon_m(r) = \begin{cases} 0.0263r, & r \le 0.2R \\ -0.00658r + 0.25, & r > 0.2R \end{cases}$$

The equation of fitted curve for θ=1.5° is:

$$\varepsilon_m(r) = \begin{cases} 0.0105r, & r \le 0.5R \\ -0.0105r + 0.4, & r > 0.5R \end{cases}$$

The equation of fitted curve for θ=0° is:

$$\varepsilon_m(r) = \begin{cases} 0.00752r, & r \le 0.7R \\ -0.0175r + 0.667, & r > 0.7R \end{cases}$$

Figure 20:
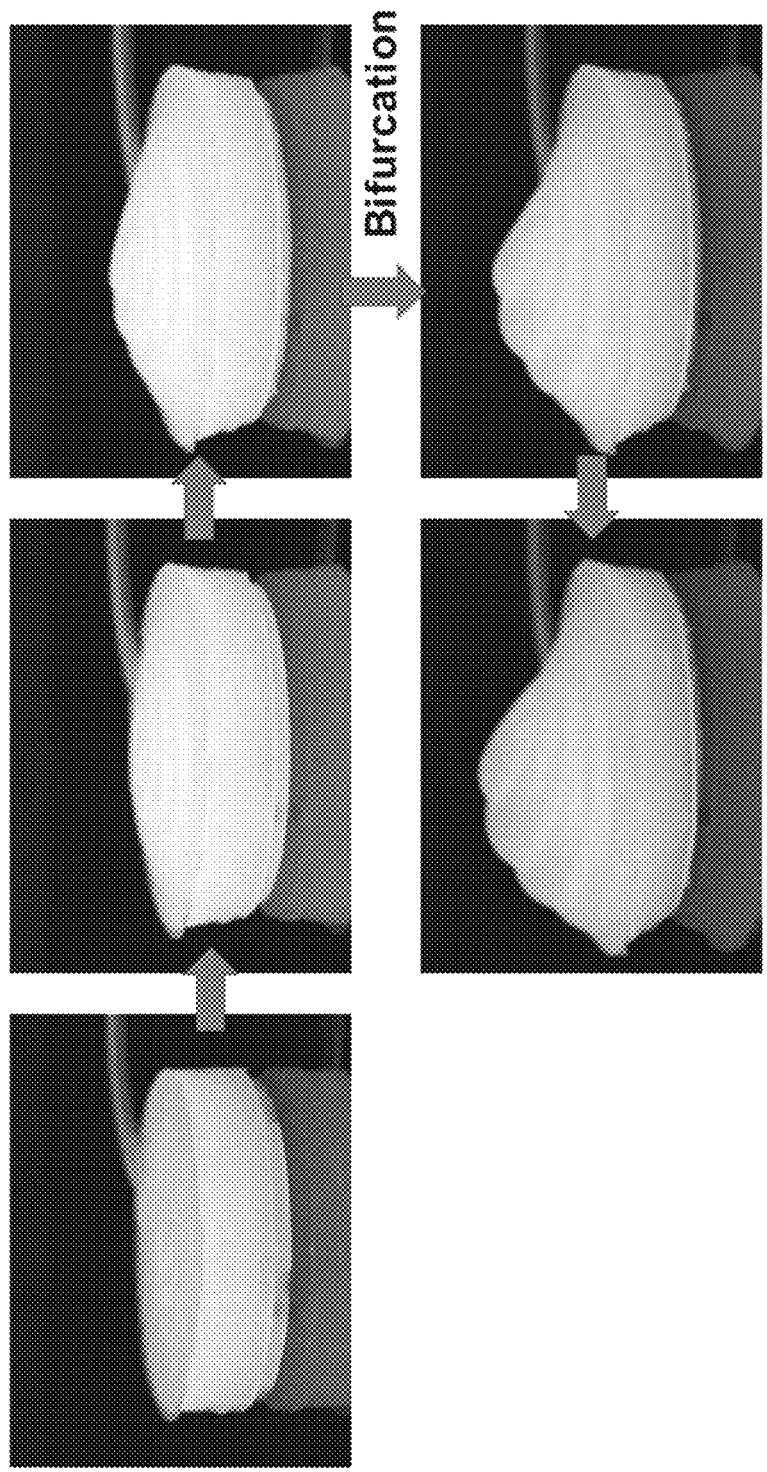

FIG. 20 depicts deformation bifurcation of doming actuator with small channel height gradient of θ=0.9° when attached to acrylics surface as the pressurization increases.

FIG. 21A and FIG. 21B depict a schematic on the geometry of the proposed annulus bilayer doming actuator with pneumatic spiral channel (FIG. 21A) and the corresponding homogenized annulus bilayer doming model (FIG. 21B). The top figure shows the cross sectional view and the bottom shows the top-view of the system.

FIG. 22A through FIG. 22D depict a design of bilayer doming-based soft gripper. (FIG. 22A) Theoretical doming angle vs. the normalized radius of the circular cut-out, $R_{in}/R$. (FIG. 22B) Measured doming angle as a function of $R_{in}/R$. (FIG. 22C) Schematic design of a gripper composed of a doming actuator (with spiral pneumatic channel) and polymeric grasping assistors (green) around the edge. (FIG. 22D) Demonstration of the proposed gripper grasping object. The scale bar is 20 mm.

Figure 23:
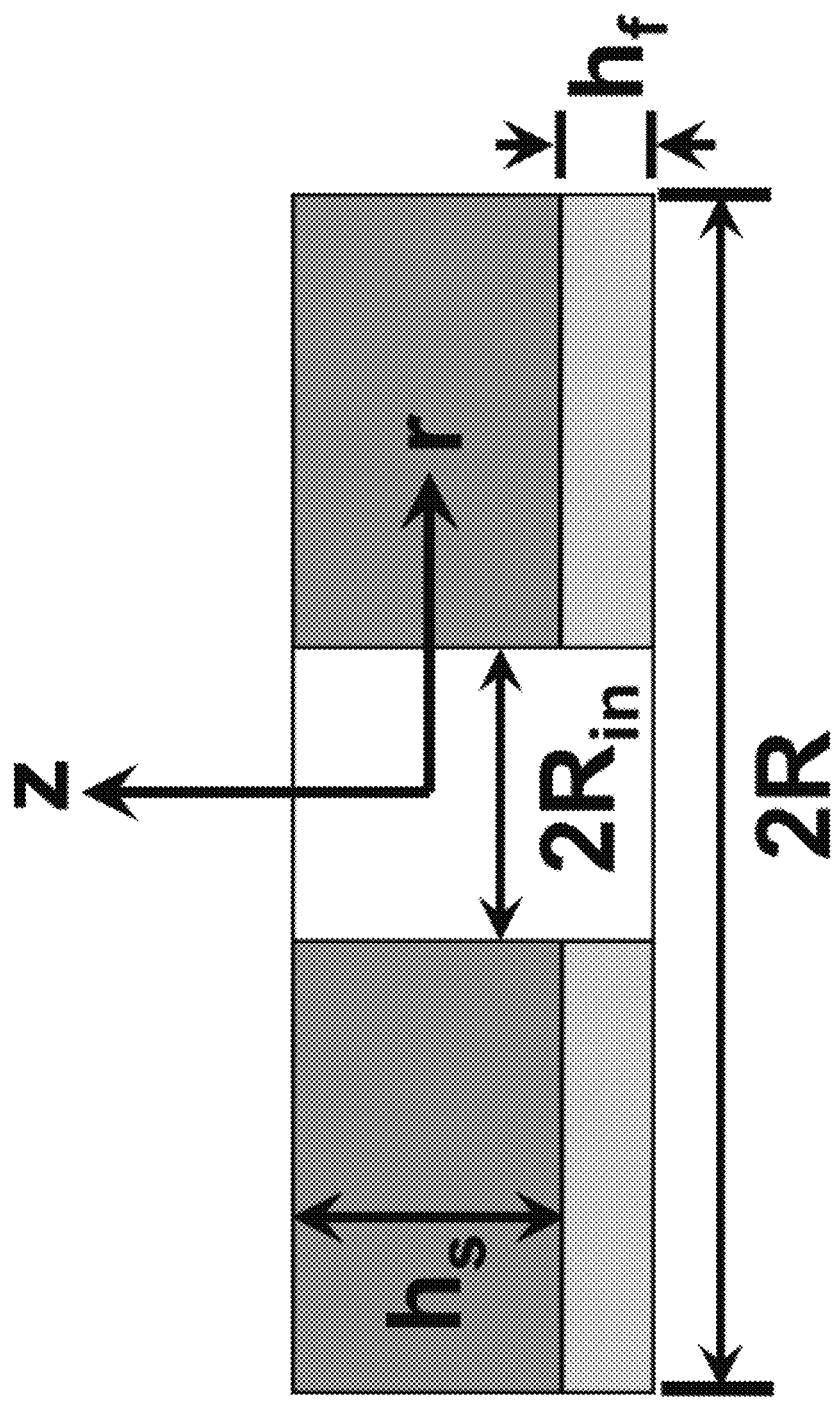

FIG. 23 depicts a schematic cross sectional view of an annulus bilayer system. The displacement of the deformed dome structure along the normal direction z-axis, $u_z$, can be obtained as:

$$\frac{du_z}{dr} = 6\frac{E_f h_f}{1-v_f^2}\frac{1-v_s^2}{E_s h_s^2}\left[(1+v_s)\frac{1}{r}\int_{R_{in}}^{r}\eta\varepsilon_m(\eta)d\eta\right] + Ar + B \quad \text{Eq. (1)}$$

The displacement of the substrate (the upper blue layer in FIG. 23) along the radial direction $u_r^s$ is:

$$u_r^s = \frac{E_f h_f}{1-v_f^2}\frac{1-v_s^2}{E_s h_s^2}\left[(1+v_s)\frac{1}{r}\int_{R_{in}}^{r}\eta\varepsilon_m(\eta)d\eta\right] + Cr + D \quad \text{Eq. (2)}$$

The displacement of the film (the lower orange layer in FIG. 23) along the radial direction $u_r^f$ is:

$$u_r^f = u_r^s - \frac{h_s}{2}\frac{du_z}{dr} \quad \text{Eq. (3)}$$

The axial forces in the substrate and film (denoted by blue and orange separately in FIG. 22) are:

$$N_r = \frac{Eh}{1-v^2}\left[\frac{du_r}{dr} + v\frac{u_r}{r} - (1+v)\varepsilon_m\right] \quad \text{Eq. (4)}$$

The bending moment of the substrate is:

$$M_r = \frac{E_s h_s^3}{12(1-v_s^2)}\left[\frac{d^2 u_z}{dr^2} + \frac{v_s}{r}\frac{du_z}{dr}\right] \quad \text{Eq. (5)}$$

Constants A, B, C and D in Equation (1) and Equation (2) can be solved by applying the boundary conditions: the net force and net moment of the structure at the free edge of the bilayer (at r=R and r=$R_{in}$) are zero:

$$\begin{cases} N_r^s + N_r^f = 0 \,@\, r = R_{in} \\ N_r^s + N_r^f = 0 \,@\, r = R \\ M_r - \dfrac{h_s}{2} N_r^f = 0 \,@\, r = R_{in} \\ M_r - \dfrac{h_s}{2} N_r^f = 0 \,@\, r = R \end{cases} \quad \text{Eq. (6)}$$

where the superscripts "s" and "f" denote the substrate and film. By combining Equation (2)-Equation (6) we can solve constants A, B, C, and D.

Figure 24:
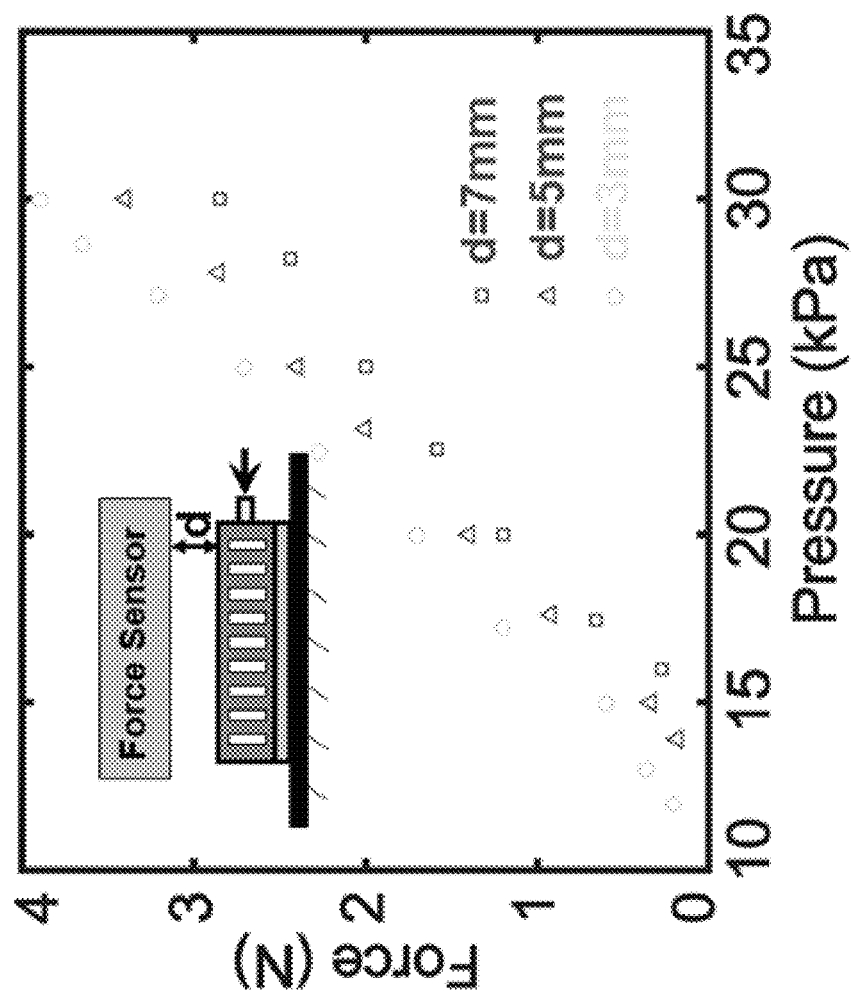

FIG. 24 depicts a block force test result. Doming force vs. input air pressure for d=3, 5 and 7 mm. The geometry of the actuator is R=28 mm, $h_s$=9 mm, $h_f$=3 mm and $h_c$=5 mm.

DETAILED DESCRIPTION

The present invention relates to a new pneumatic-actuated multifunctional doming actuator. The doming actuator can be used as a doming actuator, which can maintain machine/robotic operation on vertical surfaces without falling. The doming actuators exhibit rapid switchable adhesion/deadhesion on target surfaces upon pressurizing/depressurizing the embedded spiral pneumatic channels. The present invention also relates to novel load-carrying and climbing soft robots using the doming actuators. The soft robots are operable on a wide range of horizontal and vertical surfaces including dry, wet, slippery, smooth, and semi-smooth surfaces. In addition, the doming actuators can be used as a driving actuator for swimming soft robotics and as an actuator for soft grippers.

Definitions

It is to be understood that the figures and descriptions of the present invention have been simplified to illustrate elements that are relevant for a clear understanding of the present invention, while eliminating, for the purpose of clarity, many other elements typically found in the art. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined elsewhere, all technical and scientific terms used herein have the same meaning as commonly understood by one of ordinary skill in the art to which this invention belongs. Although any methods and materials similar or equivalent to those described herein can be used in the practice or testing of the present invention, exemplary methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 2.7, 3, 4, 5, 5.3, 6, and any whole and partial increments therebetween. This applies regardless of the breadth of the range.

Soft Doming Actuator

The present invention includes soft actuators that deform into a dome shape upon actuation. The doming actuators achieve adhesion by imitating octopus suckers. Octopus suckers exhibits strong adhesion by generating pressure difference between the cavity inside the suckers and outer circumstance upon muscle actuation. Based on this simple method to achieve adhesion, different biomimicking octopus suckers systems have been reported and fabricated through preloading or prepumping the suction cups to realize a negative pressure inside the cavity. However, these adhesion systems cannot easily realize switchable adhesion due to the difficulty of detaching process. In addition, these suction systems may not achieve strong and stable adhesion upon actuation when they are constructed from traditional extremely soft materials used in the soft robotics community (e.g. Ecoflex, Elastosil etc.). For example, directly pumping the cavity of a compliant suction cup can easily lead to the collapse of the soft structure and a dramatic shrink in volume of the cavity instead of generating a stable low vacuum space within the cavity. The doming actuators of the present invention are able to achieve switchable, strong, and stable adhesion upon actuation. Referring now to FIG. 1A and FIG. 1B, an exemplary doming actuator 10 is depicted. Doming actuator 10 comprises enclosure 12 and pneumatic channel 14. Pneumatic channel 14 is fluidly connected to pneumatic line 16.

Enclosure 12 has a cylindrical shape comprising a circular top layer, a circular bottom layer, and a curved wall connecting the top layer to the bottom layer, wherein each of the top layer, the bottom layer, and the wall are constructed from a flexible material. Any suitable material capable of reversible deformation is contemplated, including any number of elastomers such as silicon. The top layer has a first thickness and the bottom layer has a second thickness, wherein the first thickness is thinner than the second thickness.

Pneumatic channel 14 is an elongate hollow tube having a closed end and an open end, wherein the open end is fluidly connected to pneumatic line 16. Pneumatic channel 14 is positioned within enclosure 12 in a spiral configuration such that pneumatic channel 14 is coiled flat between the top layer and the bottom layer of enclosure 12. In some embodiments, pneumatic channel 14 is bonded to the top layer and the bottom layer of enclosure 12 by an adhesive or molding, such that deformation of pneumatic channel 14 also effects deformation in the top layer and bottom layer of enclosure 12.

Pneumatic channel 14 is inflatable by a gas or a liquid by way of pneumatic line 16. Pneumatic channel 14 is amenable to over inflation due to the flexible material construction. Over inflation of pneumatic channel 14 leads to deformation in the tube wall of pneumatic channel 14. As described elsewhere herein, pneumatic channel 14 is bonded to the top layer and bottom layer of enclosure 12, wherein the top layer has a first thickness that is thinner than the bottom layer having a second thickness. The differing thicknesses between the top layer and the bottom layer produces an asymmetry in the deformation of pneumatic channel 14, such that the portion of pneumatic channel 14 bonded to the thinner top layer of enclosure 12 undergoes a greater deformation than the portion of pneumatic channel 14 bonded to the thicker bottom layer of enclosure 12. As depicted in FIG. 1B, the asymmetric deformation of pneumatic channel 14 triggers a shape change in doming actuator 10 from a flat shape to a cup shape. The extent of deformation is controllable by the amount of gas or liquid over inflating pneumatic channel 14. In some embodiments, the level of inflation can be measured in terms of pressure, such as an inflation pressure of between 1 and 1000 kPa. Pneumatic channel 14 is deflatable by removing the amount of gas or liquid by way of pneumatic line 16, wherein complete deflation reverses any deformation and returns doming actuator 10 from a cup shape to a flat shape.

Doming Actuator as a Driving Actuator for Swimming Robotics and Grippers

Figure 2A:
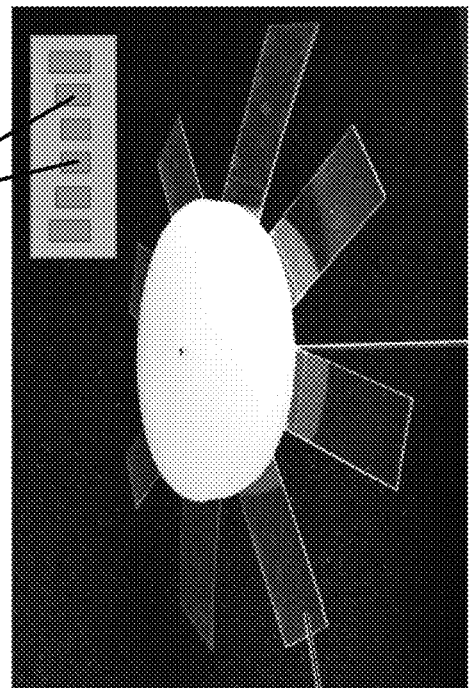
FIG. 2A and FIG. 2B depict an exemplary jelly-fish inspired swimming soft robot (FIG. 2A) without actuation and (FIG. 2B) upon actuation. The inset in FIG. 2A shows a cross sectional side view of a schematic design of the actuator with embedded channels having a gradient height, which generates a larger curvature at the edges of the actuator upon actuation.
Figure 2B:
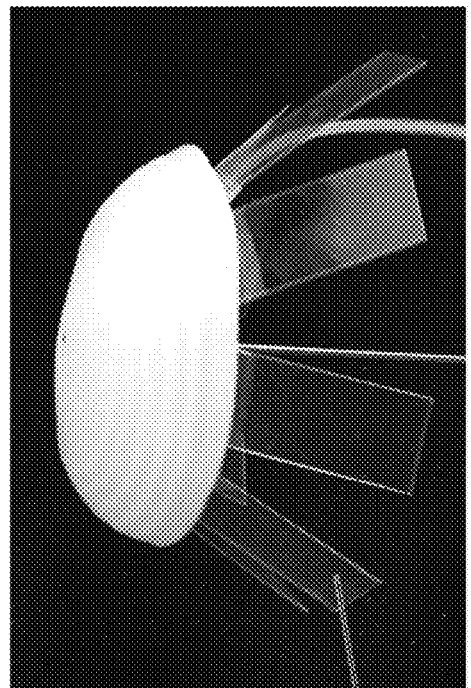

In various embodiments, doming actuators 10 is amenable to one or more attachments. For example, in FIG. 2A and FIG. 2B, an exemplary doming actuator 10 comprises a plurality of fins 30, fans or flippers attached to the bottom layer of enclosure 12. In a deflated state, doming actuator 10 and fins 30 lie flat. In an over inflated state, doming actuator 10 forms a cup shape and the plurality of fins 30 are pointed downwards with the deformation of the bottom layer of enclosure 12. Alternating doming actuator 10 between a deflated state in FIG. 2A and an inflated state in FIG. 2B can permit movement through an aqueous environment in a manner similar to a jellyfish.

In another example, FIG. 3A and FIG. 3B depict an exemplary doming actuator 10 comprising a plurality of appendages 32 or hooks. In a deflated state, doming actuator 10 is flat and the plurality of appendages 32 hang off of the bottom layer of enclosure 12 at an angle. In an over inflated state, doming actuator 10 forms a cup shape and the plurality of appendages 32 close inwards with the deformation of the bottom layer of enclosure 12. Alternating doming actuator 10 between a deflated state in FIG. 3A and an inflated state in FIG. 3B can permit appendages 32 to close around and grasp an object and to release the object.

Doming Actuator Soft Robotics

The present invention further includes soft robots using one or more doming actuators of the present invention. The soft doming actuators can be used as doming actuators capable of strong doming and rapid switching between doming and detachment. The doming actuators enable the soft robots to quickly and reversibly adhere to a surface. The doming actuators enable the soft robots to traverse across a variety of surfaces and to support a weighted load.

Figure 4A:
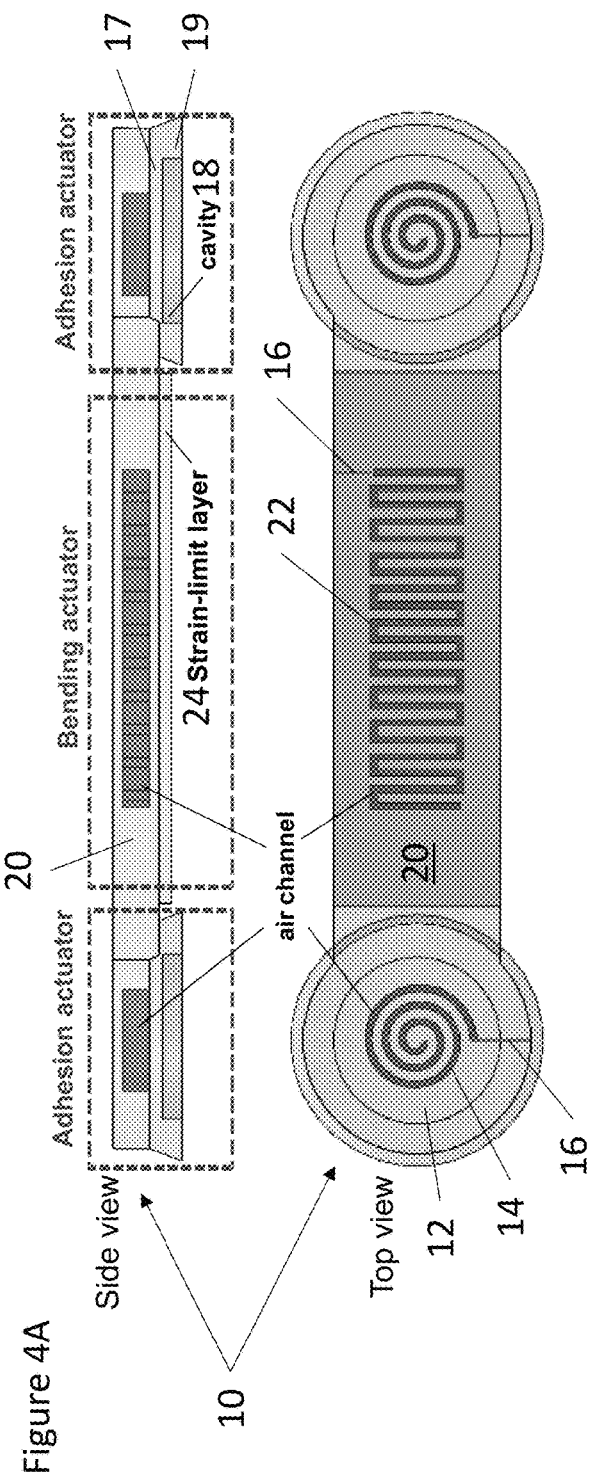
FIG. 4A through FIG. 4D depict the design of an exemplary climbing and walking soft robot (CWSR).
Figure 4B:
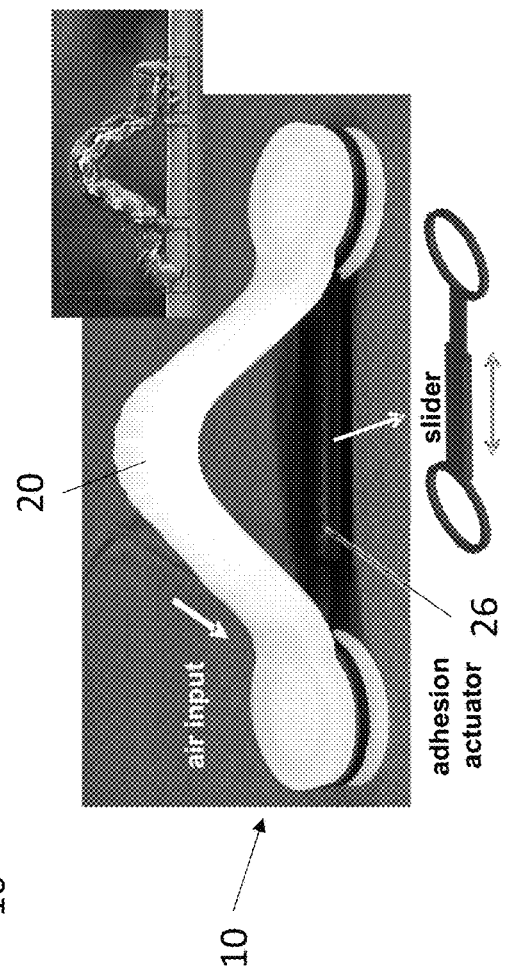

Referring now to FIG. 4A and FIG. 4B, an exemplary soft robot is depicted. The soft robot comprises an elongate bending actuator 20 having a doming actuators 10 positioned at both ends. Each of the doming actuators 10 can further comprise a cup 17 bonded to the bottom layer of enclosure 12, the cup 17 having a cavity 18 bordered by a sealing lip 19. In certain embodiments, the features of cup 17 (such as sealing lip 19 and cavity 18) can be incorporated into doming actuator 10 to form a single uninterrupted component.

Figure 4C:
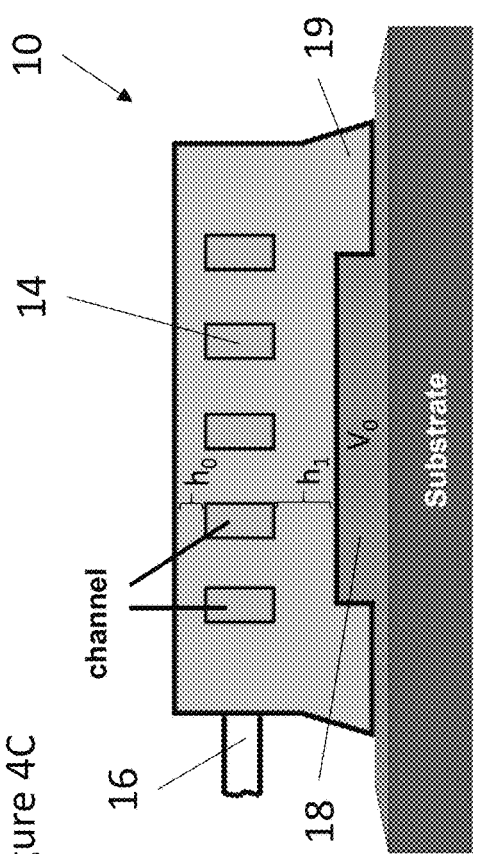

Cup 17 enhances the conformability of doming actuator 10 to a surface. As depicted in FIG. 4C, cup 17 provides a cavity 18 between the bottom layer of doming actuator 10 and a surface, and sealing lip 19 forms a large seal around cavity 18. Inflating pneumatic channel 14 deforms doming actuator 10 into a cup shape, which increases the volume of cavity 18 and decreases the pressure within cavity 18. In this manner, the pressure difference between the cavity 18 and the exterior environment produces a secure seal between doming actuator 10 and the surface.

Bending actuator 20 is constructed from a length of flexible material having a top layer and a bottom layer. Any suitable material capable of reversible deformation is contemplated, including any number of elastomers such as silicon. Bending actuator 20 comprises a pneumatic channel 22 embedded in a zigzag pattern within bending actuator 20 for at least a portion of the length of bending actuator 20. Pneumatic channel 22 is an elongate lumen having a closed end and an open end, wherein the open end is fluidly connected to pneumatic line 16. Pneumatic channel 22 is inflatable by a gas or a liquid by way of pneumatic line 16. Pneumatic channel 22 is amenable to over inflation due to the flexible material construction of bending actuator 20. Over inflation of pneumatic channel 22 leads to deformation in the bending actuator 20. The extent of deformation is controllable by the amount of gas or liquid over inflating pneumatic channel 22. In some embodiments, the level of inflation can be measured in terms of pressure, such as an inflation pressure of between 1 and 1000 kPa. Pneumatic channel 22 is deflatable by removing the amount of gas or liquid by way of pneumatic line 16, wherein complete deflation reverses any deformation in bending actuator 20.

In some embodiments, bending actuator 20 comprises a strain-limiting layer 24 bonded to the bottom of bending actuator 20. Strain-limiting layer 24 can be constructed from any suitably bendable but non-stretchable material, such as a layer of plastic, polymer, metal, or fibrous material. Strain-limiting layer 24 produces an asymmetry in the deformation of bending actuator 20 by preventing lengthening deformation in the bottom of bending actuator 20 while allowing deformation in the top of bending actuator 20. As depicted in FIG. 4B, the asymmetric deformation of bending actuator 20 triggers a shape change from a flat shape to an arched shape.

In some embodiments, bending actuator 20 comprises a top layer having a first thickness and a bottom layer having a second thickness, wherein the first thickness is thinner than the second thickness (not pictured). The differing thicknesses between the top layer and the bottom layer of bending actuator 20 produces an asymmetry in the deformation of bending actuator 20, such that the thinner top layer of bending actuator 20 undergoes a greater deformation than the thicker bottom layer of bending actuator 20. Similar to the depiction in FIG. 4B, the asymmetric deformation of bending actuator 20 triggers a shape change from a flat shape to an arched shape.

In certain embodiments, the soft robot can further comprise a slider 26 (FIG. 4B). Slider 26 promotes linear deformation in bending actuator 20 and is constructed from two interlocking linear pieces, wherein the interlocking linear pieces slide over one another to lengthen or shorten slider 26. Each end of slider 26 can be attached to a doming actuator 10 or to a cup 17. In this manner, alternating bending actuator 20 between an inflated state and a deflated state can lengthen and shorten slider 26.

In certain embodiments, the soft robot can comprise two doming actuators 10 connected by a left bending actuator 20 and a right bending actuator 20 side by side in parallel (not pictured). In certain embodiments, the soft robot can comprise two doming actuators 10 connected by a single bending actuator 20 comprising two or more parallel pneumatic channels 22, such as a left embedded pneumatic channel 22 and a right embedded pneumatic channel 22 side by side in parallel (not pictured). Through selective inflation, the soft robot can be capable of turning motion. For example, by inflating only the left bending actuator 20 or only the left embedded pneumatic channel 22, the soft robot will curve in a rightward direction. By inflating only the right bending actuator 20 or only the right embedded pneumatic channel 22, the soft robot will curve in a leftward direction. Linear motion can be achieved by simultaneously inflating both the left and right bending actuators 20, or both the left and right embedded pneumatic channels 22. In certain embodiments, the soft robot can comprise two doming actuators 10 connected by a multiple degree-of-freedom (DOF) bending actuator (not pictured). The multiple-DOF bending actuator can be an actuator with multiple parallel pneumatic channels. Each channel, upon inflation, triggers the bending actuator to bend along a specific direction, thus controlling the inflation status or the inner pressure of different channels to realize multiple-DOF locomotion for the soft robot.

In some embodiments, bending actuator 20, slider 26, or both can be supplemented with or replaced with a tension-compression soft actuator. The tension-compression soft actuator can be a passive actuator (such that the actuator is passively under compression or under tension) or an active actuator (such that the actuator is controllable between compression and tension). The soft actuator can enhance the speed and strength of the soft robot by increasing the physical connection between two doming actuators.

As described elsewhere herein, the soft robot can be used to traverse across a surface. Locomotion is achieved by inflating and deflating the doming actuators and the bending actuator in sequence. For example, an exemplary soft robot having a first doming actuator, a second doming actuator, and a bending actuator connecting the first doming actuator to the second actuator can be moved in the direction of the first doming actuator in a five-step sequence. In the first step, the first doming actuator is inflated to secure the first doming actuator to a surface. In the second step, the bending actuator is inflated, wherein the arching of the bending actuator pulls the second doming actuator closer to the first doming actuator. In the third step, the second doming actuator is inflated to secure the second doming actuator to the surface. In the fourth step, the first doming actuator is deflated to release the first doming actuator from the surface. In the fifth step, the bending actuator is deflated, wherein the flattening of the bending actuator pushes the first doming actuator away from the second doming actuator. The sequence can then be repeated starting from the first step to continue movement across the surface.

In some embodiments, the soft robot can comprise a plurality of doming actuators and bending actuators. For example, the soft robot can comprise four or more doming actuators connected by four or more bending actuators. The resulting soft robot can have an X-shape, and can manipulate each doming actuator and bending actuator using the steps described above to achieve movement in any direction.

As described elsewhere herein, the soft robot is capable of traversing across a variety of surfaces. For example, the soft robot is capable of traversing smooth surfaces such as glass, metals and acrylic, as well as semi-smooth surfaces such as sandpaper and textured or decorated walls. The soft robot is capable of traversing across dry surfaces, damp surfaces, and wet surfaces. The soft robot is capable of traversing flat surfaces or inclined surfaces, up to a 90 degree incline. The soft robot is capable of traversing across underwater surfaces. In various embodiments, the soft robot is capable of supporting weighted loads during locomotion. In various embodiments, the soft robot can support a weight that is 1×, 2×, 3×, 4×, 5×, 6×, 7×, 8×, 9×, 10× the weight of the soft robot, or much larger weight by geometric scaling or adjustment of the doming actuator. In various embodiments, the soft robot is suitable for operation under a variety of conditions, including but not limited to: interior and exterior of tanks, reservoirs, and pipelines, including oil storage in the petrochemical industry; interior and exterior of vessels, including ship hulls above and below water and aircraft in air and on ground; hazardous environments, including nuclear power plants and chemical plants; and difficult to reach areas, including high rise buildings, piers, and bridges. The soft robot can be useful for payload delivery, inspection, surveillance, repair, cleaning, and maintenance. The soft robot can thereby carry any number of cargo and instruments, including but not limited to one or more sensors, wireless controller modules, batteries, cameras, manipulators, pneumatic pumps, containers, and the like.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the compounds of the present invention and practice the claimed methods. The following working examples therefore, specifically point out exemplary embodiments of the present invention, and are not to be construed as limiting in any way the remainder of the disclosure.

Example 1: Doming Actuator for Climbing and Walking Soft Robot

The following study presents a bio-inspired design for climbing and walking soft robots (CWSR) actuated through embedded pneumatic channels for both doming and locomotion. The success lies in the newly designed octopus-inspired soft doming actuator, which allows for switchable strong doming and rapid actuation. Rather than the conventional way of applying negative pressure to the suction actuator (i.e., pumping air out to generate a vacuum), positive pressure is used to actuate the switchable adhesion by pressurizing the embedded spiral channels. The experimental soft robot using the doming actuators can realize climbing on various types of vertical surfaces, with a good load-carrying capability on smooth, semi-smooth, dry, wet, and slippery surfaces, as well as in underwater walking and climbing.

FIG. 4A schematically shows the bio-inspired design of the CWSR by mimicking the locomotion of inchworms (inset of FIG. 4B). The elastomeric material was chosen as the soft material for fabricating the CWSR due to its low stiffness and hyperelasticity, allowing for repetitive loading and unloading at large strain. The CWSR shown in FIG. 4B was fabricated by curing elastomeric materials in 3D printed molds. Similar to an inchworm, the CWSR consists of three actuation parts (FIG. 4A): one bending actuator driving the locomotion of the soft machine by bending its soft body, and two doming actuators on each end of the bending actuator, enabling strong switchable adhesion force required for attaching and detaching on target surfaces.

The bending actuator has a two-layer structure. On the top, it has embedded rectangular wave-like pneumatic channels in the hyperelastic elastomer (highlighted in blue in FIG. 4C). The bottom is bonded with a strain-limiting layer. A thin sheet of stock paper was used for the bottom layer due to its inextensibility and light weight (highlighted in gold color in FIG. 4A). When the channels are pneumatically pressurized, they induce the expansion of the top layer. Since the bottom layer is inextensible, the mismatch in the deformation of the two layers upon actuation causes the actuator to bend (FIG. 4B).

The design of the doming actuators is inspired by the mechanism of the suction cups of an octopus, utilizing the pressure difference inside and outside of the cup cavity. Rather than the conventional method of directly deflating the cavity to generate a vacuum, the doming actuators employ a pressurized inflation method to actuate the switchable adhesion of the doming actuators to a foreign surface. The soft circular doming actuator has embedded spiral pneumatic channels (FIG. 4A) and a cavity of volume of $V_o$ below the chambers (FIG. 4C, top). The working mechanism for actuating switchable adhesion is explained as follows: when inflating air into the channels, the spiral air channels expand and deform the doming actuator into a dome shape (FIG. 4C, bottom). Meanwhile, the cavity below deforms accordingly and also becomes a dome shape with an increasing volume ($V_o+\Delta V$). The increase in the cavity volume leads to a pressure drop $\Delta P$ in terms of $P_o V_o=(P_o-\Delta P)(V_o+\Delta V)$, thus generating a pressure difference between the internal cavity and the external circumstance $P_o$, inducing the actuator to tightly attach to the substrate. The generated adhesion force is mainly determined by the magnitude of the pressure difference, which can be tuned by manipulating the geometric size of the actuator, including the channel size, the layer thickness above ($h_0$) and below ($h_1$) the spiral channel, the cavity volume, etc. Generally, either a smaller $h_1/h_0$ ($h_1>h_0$ is required) or a smaller cavity volume results in a larger shear adhesion force, while a smaller cavity volume in the soft doming actuator sacrifices conformability with the adhered substrate surface.

Based on this simple method of generating adhesion force via deformation, adhesion of the doming actuators can be rapidly and reversibly switched between the adhesion-ON and adhesion-OFF states by simply pressurizing and depressurizing the embedded channels, respectively. Compared to the traditional suction actuator of directly pumping air out for adhesion, the pressurization-based soft doming actuator is more stable and controllable. Pneumatic inflation into the soft doming actuator can stiffen the soft structure, thus retaining or improving the structural stability of the suction cup. In contrast, the traditional method of directly depressurizing the cavity could easily lead to the collapse of the soft structure due to its highly deformable and flexible characteristics, where the uncontrollable and unstable structural deformation could largely weaken or even eliminate the adhesion force of the soft suction cup upon deflation.

In addition to the three actuators, a hard slider (FIG. 4B) is implemented to connect the two doming actuators. The connector limits the two doming actuators to translate and move freely along the slider within the same plane. The connector constrains any possible rotational movement to prevent their detachment from the target surface, such as during the climbing of vertical surfaces. Thus, the slider will force the two doming actuators to firmly contact the substrate during walking and climbing locomotion. Furthermore, the slider plays an additional role as a hard skeleton, providing the soft machine with support and stability.

Figure 4D:
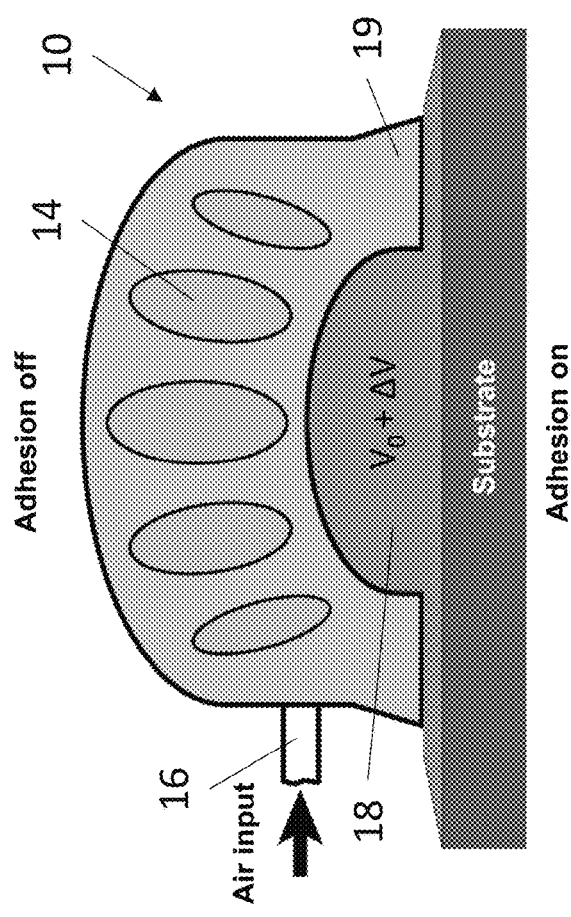

By pneumatically actuating the three actuators in sequence with a pneumatic control system, the CWSR demonstrates both the walking (FIG. 4D) and climbing (FIG. 5) modes of the designed soft machine on a smooth surface (e.g. an acrylic plate) with a certain load-carrying capability. One cycle of the locomotion of the CWSR involves five sequential steps. First, the front doming actuator (FAA) is pressurized to adhere to the target surface (FIG. 4D(i) and FIG. 5(a)). Second, the bending actuator (BA) is then activated by pressurization for simultaneous locomotion by moving the OFF-state rear doming actuator (RAA) forward (horizontal surface, FIG. 4D(ii)) or upward (vertical surface, FIG. 5(b)), and pulling or lifting the carried load forward or upward. Third, the RAA is actuated through pressurization to attach to the substrate, which helps to hold the carried load (FIG. 4D(iii) and FIG. 5(c)). Fourth, the FAA is switched to an OFF-state by depressurization to release the adhesion (FIG. 4D(iv) and FIG. 5(d)). Last, the BA is depressurized to release the stored bending energy to push the OFF-state FAA forward along the slider (FIG. 4D(v) and FIG. 5(e)). Simply repeating the sequential steps above can achieve an effective locomotion with a large translation. The motion of the soft machine can be actively tuned and controlled by varying the pneumatic pressurization and adjusting geometric parameters of the slider.

Compared to previously reported soft machines, one of the advantages of the CWSR is that it can carry more loads with the help of the doming actuator. With further geometric optimization of the doming actuator, the CWSR is expected to be capable of carrying much heavier loads.

Figure 6C:
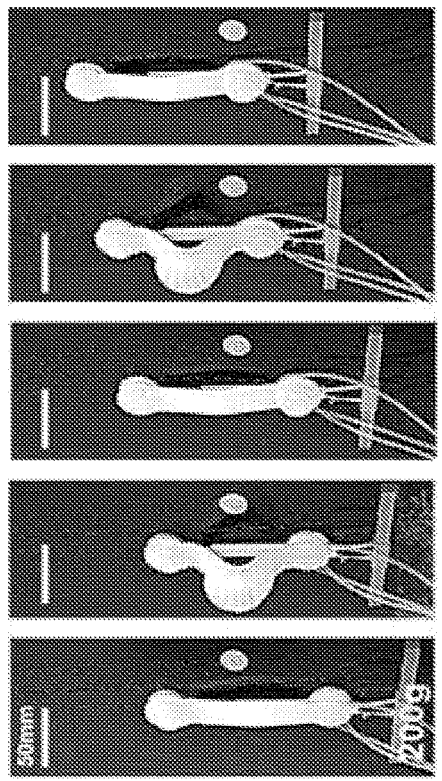
Figure 6D:
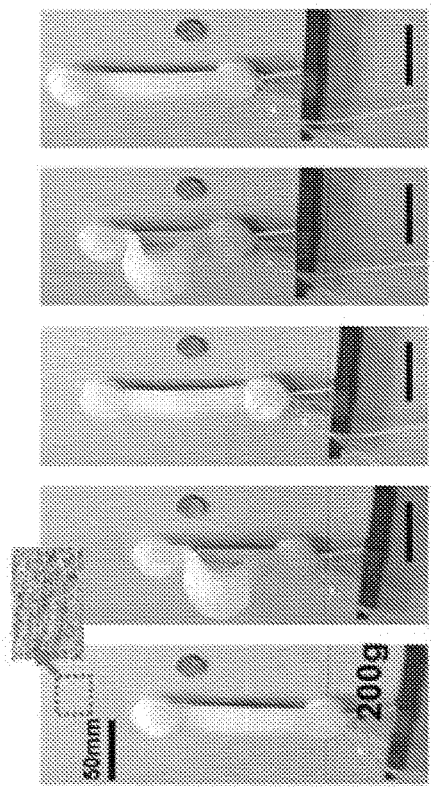

In additional to smooth surfaces, the climbing of the CWSR is also demonstrated on slippery (FIG. 6C), semi-rough surfaces (FIG. 6D), and underwater surfaces (FIG. 7B, FIG. 7C).

In conclusion, the present study demonstrates a bioinspired simple, novel, proof-of-concept soft robot that can walk horizontally and climb vertically on different types of smooth and semi-smooth substrates with a certain load-carrying capability. The targeted surfaces can be dry, semi-smooth, wet, slippery, and even underwater. The success lies in the new design of soft doming actuators with embedded spiral pneumatic channels for switchable, strong, and mechanically robust adhesion on different types of surfaces upon pressurization. The soft doming actuator provides a new platform for designing soft robots that can operate on vertical surfaces and work underwater, which could find potential applications in the design of switchable adhesion materials, object transportation, wall-cleaning, camouflage machines, underwater soft machines, etc.

Example 2: Switchable Doming Actuator for Amphibious Climbing Soft Robot

Recently, the study of soft robots has attracted tremendous research interest in both science and engineering, due to their great potential to interact with humans and the environment more safely and more adaptively. Soft continuum robots are often made of highly deformable soft materials to allow compliance, endurability, and elasticity (Shepherd R F et al., Proceedings of the national academy of sciences, 2011, 108(51):20400-20403). Bioinspired by soft-bodied systems in nature such as caterpillar (Rogoz M et al., Advanced Optical Materials, 2016, 4(11):1689-1694; Lin H T et al., Bioinspiration & biomimetics, 2011, 6(2):026007), meshworm (Seok S et al., IEEE/ASME Transactions on mechatronics, 2013, 18(5):1485-1497; Boxerbaum A S et al., The international journal of Robotics Research, 2012, 31(3):302-318), octopus (Calisti M et al., Bioinspiration & biomimetics, 2015, 10(4):046012; Cianchetti M et al., Bioinspiration & biomimetics, 2015, 10(3):035003; Wehner M et al., Nature, 2016, 536(7617):451), and fish ( ) Marchese A D et al., Soft Robotics, 2014, 1(1):75-87), extensive research efforts have been dedicated to mimicking a variety of biological locomotion modes, including walking (Shepherd R F et al., Proceedings of the national academy of sciences, 2011, 108(51):20400-20403; Rogoz Metal., Advanced Optical Materials, 2016, 4(11):1689-1694; Seok S et al., IEEE/ASME Transactions on mechatronics, 2013, 18(5):1485-1497; Boxerbaum A S et al., The international journal of Robotics Research, 2012, 31(3):302-318 Jayaram K et al., Proceedings of the National Academy of Sciences, 2016, 113(8):E950-E957; Tolley M T et al., Soft robotics, 2014, 1(3):213-223; Morin S A et al., Science, 2012, 337 (6096):828-832), jumping (Lin H T et al., Bioinspiration & biomimetics, 2011, 6(2):026007; Bartlett N W et al., Science, 2015, 349(6244):161-165; Shepherd R F et al., Angewandte Chemie, 2013, 125(10):2964-2968), and swimming (Marchese A D et al., Soft Robotics, 2014, 1(1):75-87; Renda F et al., Bioinspiration & biomimetics, 2015, 10(5): 055005; Serchi F G et al., IEEE/ASME Transactions On Mechatronics, 2013, 18(2):484-493; Song S H et al., Bioinspiration & biomimetics, 2016, 11(3):036010), in soft robotics. The locomotion is realized through deforming their soft bodies by means of bending (Tolley M T et al., Soft robotics, 2014, 1(3):213-223; Wang W et al., Bioinspiration & biomimetics, 2014, 9(4):046006), expanding or contracting (Seok S et al., IEEE/ASME Transactions on mechatronics, 2013, 18(5):1485-1497; Seok S et al., Robotics and Automation (ICRA), 2010 IEEE International Conference on. IEEE, 2010), twisting (Rogoz M et al., Advanced Optical Materials, 2016, 4(11):1689-1694; Boxerbaum A S et al., The international journal of Robotics Research, 2012, 31(3): 302-318), or combined in response to external stimuli, including pneumatic or hydraulic pressure (Shepherd R F et al., Proceedings of the national academy of sciences, 2011, 108(51):20400-20403; Tolley M T et al., Soft robotics, 2014, 1(3):213-223), temperature (Seok S et al., IEEE/ASME Transactions on mechatronics, 2013, 18(5):1485-1497), light (Rogoz Metal., Advanced Optical Materials, 2016, 4(11):1689-1694), and electrical (Lin H T et al., Bioinspiration & biomimetics, 2011, 6(2):026007) or magnetic field (Miyashita S et al., Science Robotics (2017)).

Despite these advancement in locomotive soft robotics, design of amphibious soft climbing robots on ground and under water remains to be explored, the study of which could largely push the boundaries of robot capabilities and multifunctionality (Laschi C et al., Sci. Robot., 2016, 1(1): eaah3690). Climbing, as one of the most fundamental locomotion modes in nature, has long been fascinating to the researchers in the biological and robotics field due to its potential applications in intelligent surveillance, inspection, maintenance, and detection under environments away from the ground (Balaguer C et al., Autonomous Robots, 2005, 18(2):157-169). Given the harsh working environment (e.g., high altitude), when compared to rigid robots, climbing robots made of soft materials could largely increase the chance of surviving a fall due to their extreme compliance. To counter the gravity force, the main challenge of self-supported climbing robots lies in the design of fast, switchable, and strong doming actuators for not only easily attaching and detaching the targeted vertical surfaces upon actuation for locomotion, but also allowing certain load-carrying capability for potential functionality under different complex 2D or 3D working environment (Sitti M et al., Robotics and Automation, 2003). In rigid climbing robots constructed from rigid links and adhesion pads, the adhesion to surfaces has been achieved through two major mechanisms: geckoinspired micro-fibrillar adhesives for dry and directional adhesion (Laschi C et al., Sci. Robot., 2016, 1(1):eaah3690; Sitti M et al., Robotics and Automation, 2003; Autumn K et al., Nature, 2000, 405(6787):681; Tian Y et al., Proceedings of the National Academy of Sciences, 2006, 103(51):19320-19325; Aksak B et al., Robotics and Automation, 2008) and octopus-inspired suckers for vacuum suction adhesion (Kier W M et al., Integrative and Comparative Biology, 2002, 42(6):1146-1153; Smith A M et al., Journal of Experimental Biology, 1991, 157(1):257-271; Tramacere F et al., Interface focus, 2015, 5(1):20140050; Zhu J et al., Journal of Intelligent and robotic Systems, 2002, 35(4):427-443; Lee H et al., Advanced Materials, 2016, 28(34):7457-7465).

However, it remains very challenging to either apply the gecko-inspired adhesives for wet doming and underwater locomotion, or directly transfer air-pumping suckers to design soft climbing robotics due to the potential issue of structure failure. For example, vacuum pumping a suction cup made of extremely soft materials (e.g., ecoflex, elastosil, hydrogel, etc.) can easily lead to the collapse of the soft structure (Yang D et al., Advanced Materials, 2015, 27(41): 6323-6327; Yang D et al., Advanced Materials Technologies, 2016, 1(3)), thus it fails to achieve desired strong and stable adhesion upon actuation.

To address the challenge, the following study proposes a novel soft doming actuator that allows for switchable and strong dry/wet adhesion without structural collapse upon rapid actuation. The soft doming actuator is made of extremely soft elastomer ecoflex and composed of two layers with an embedded spiral pneumatic channel on top of a cylindrical chamber. Rather than the traditional way of applying negative pressure for suction adhesion (i.e., pumping air out of the chamber for vacuum), positive pressure is used to deform the planar bilayer structured soft actuator into an inflated 3D dome shape for achieving stable and switchable adhesion. Guided by a simplified bilayer doming model, a parametric study is conducted on manipulating the geometry of the doming actuator for achieving high and stable shear adhesion force. Based on this doming actuator, an inchworm-inspired amphibious soft robot is designed and fabricated that can climb and walk on ground and under water. The soft robot is demonstrated and characterized to have a wide capability of vertical climbing on various types of surfaces with certain load-carrying capability, including smooth, semi-smooth, dry, wet, and slippery surfaces, in addition to underwater walking and climbing.

The results are now described.

Working Mechanism of Soft Doming Actuators

FIG. 8A shows the schematics of octopus suction cup inspired design of a switchable doming actuator. It is composed of a bilayer structure with an embedded pneumatic spiral channel on the top and a cylindrical chamber (cavity) underneath (right of FIG. 8A). The soft actuator is fabricated by curing elastomer (Ecoflex 00-50; Smooth-on, Inc.) in 3D printed molds followed by demolding. FIG. 8B shows the fabricated soft doming actuator before (left) and after actuation (right) by depressurizing/pressurizing the spiral pneumatic channel on the top, respectively.

The working mechanism for actuating the switchable adhesion is schematically illustrated in FIG. 8C. Octopus sucker exhibits strong adhesion by generating pressure difference between the cavity inside the suckers and outer circumstance upon muscle contraction to squeeze out the air in the cavity. Rather than squeezing air or water out of the cavity in the octopus sucker, air is inflated into the channel on the top to generate a negative pressure in its underneath cavity for achieving adhesion. After inflating air into the spiral channel on the top, it will generate mismatched expanding deformation between the two layers and deform the planar structure into a 3D dome shape after actuation (right of FIG. 8B, FIG. 8C) (Gladman A S et al., Nature materials, 2016, 15(4):413; Modes C D et al., Proceedings of the Royal Society of London A: Mathematical, Physical and Engineering Sciences, 2011, 467(2128)). Consequently, the connecting underneath chamber (cavity) deforms coherently into a dome shape with an increased volume $(V_o+\Delta V)$ ($V_o$ is the original volume of the chamber or cavity and $\Delta V$ is the volume change). For the case of on ground, before actuation, the cavity is filled with atmosphere air and its pressure inside is equal to the atmosphere pressure $P_o$. Upon actuation, the increased volume leads to a pressure drop $\Delta P$ in the cavity in terms of $P_oV_o=(P_o-\Delta P)(V_o+\Delta V)$, thus, it generates a pressure difference $\Delta P$ between the internal cavity $P_c$ and the external circumstance $P_o$, that is, $\Delta P=P_o-P_c$, forcing the soft actuator to conformably attach the foreign surface with its extreme compliance. The generated adhesion force is mainly determined by the pressure difference $\Delta P$ inside and outside the cavity, which can be tuned by manipulating the geometrical size of the actuator, including the channel size, layer thickness above ($h_0$) and underneath ($h_1$) the spiral channel, and cavity volume (FIG. 8C).

Based on this simple method of generating adhesion force via doming-induced pressure difference, the doming actuator can be rapidly and reversibly switched on and off by simply pressurizing and depressurizing the embedded spiral channel, respectively. It should be noted that the traditional suction actuator, by means of directly pumping air out of the cavity for vacuum-induced adhesion, will lead to the collapse of the soft structure (Yang D et al., Advanced Materials, 2015, 27(41):6323-6327; Yang D et al., Advanced Materials Technologies, 2016, 1(3)) due to its highly deformable and extreme compliance characteristics. In contrast, the positive pressure-based soft doming actuator is more stable and controllable. Pneumatic inflation into the soft doming actuator can help stiffen the soft structure, thus retains and enhances the structural stability of the suction cup.

Modeling of Doming Actuator as Simplified Bilayer Doming System

To shed some light on the design of the doming actuator, a simplified and approximate bilayer model was employed with non-uniform axisymmetric mismatched expansion between circular-shaped layers (Freund L B et al., Applied Physics Letters, 1999, 74(14):1987-1989) to understand the volume change in the cavity after doming.

For a bilayer system composed of a circular thin film (thickness of $h_f$) on a substrate (thickness of $h_s$) with radius of R as shown in FIG. 9A ($h_f \ll h_s$), when it is subjected to a non-uniform but axisymmetric misfit strain $\varepsilon_m$ (r) along the radial direction r, the height $u_z$ of the deformed dome structure along the normal direction z-axis can be obtained as (Huang Y et al., Journal of the Mechanics and Physics of Solids, 2005, 53(11):2483-2500):

$$u_z = -\frac{6E_f h_f}{1-v_f^2} \frac{1-v_s^2}{E_s h_s^2} (1+v_s) \left[ \int_0^r \frac{1}{r} \int_0^r \eta \varepsilon_m(\eta) d\eta dr + \right. \quad \text{Eq. (7)}$$

$$\left. \left( \frac{1-v_s}{1+v_s} - 2\frac{v_s-v_f}{(1+v_s)^2} \right) \frac{r^2}{2R^2} \int_0^R \eta \varepsilon_m(\eta) d\eta \right] + A$$

where E and m are the Young's modulus and Poisson's ratio. The subscripts f and s represent the film and substrate, respectively. r (or η) is the radial distance from the center. A is a constant to be determined by satisfying the assumed boundary condition of $u_z$ (R)=0. When applying the continuum bilayer model to the doming actuator as shown in FIG. 9B, it is assumed that $h_f$ and $h_s$ take the value of $(h_1-h_0)$ and $(2h_0+h_c)$, respectively, that is, $h_f=h_1-h_0$ and $h_s=2h_0+h_c$. It is also assumed the same materials properties, E and m, for both the film and substrate. Here, a simplified homogenized bilayer model is used by neglecting the detailed channeled structure in the top layer while considering the mismatched expansion induced by pressurization in the channel. Equation (7):

$$u_z = -6(h_1-h_0)\frac{1+v}{(2h_0-h_c)^2}\left[\int_0^r \frac{1}{r}\int_0^r \eta\varepsilon_m(\eta)d\eta dr + \right. \quad \text{Eq. (8)}$$

$$\left. \frac{1-v}{1+v}\frac{r^2}{2R^2}\int_0^R \eta\varepsilon_m(\eta)d\eta\right] + A$$

Upon expansion of the top layer, the volume change of the cavity can be obtained as follows:

$$\Delta V = 2\pi \cdot \int_0^R r u_z dr \quad \text{Eq. (9)}$$

It should be noted that Equation (9) ignores the displacement along the radial direction since this displacement is significantly small when the thickness of the cup (the thin wall that wraps around the cavity) is large, which will limit the radial expansion of the whole structure. In addition, Equation (9) is an idealized situation, which does not consider the effect of the resulting internal pressure drop inside the cavity from the volume change. A more refined bilayer bending model will be developed in the future by balancing the in-plane mismatched expansion induced doming deformation and the doming-induced pressure change in the cavity.

With Equation (9), the pressure difference can be determined between the cavity of air and atmosphere upon actuation as below:

$$\Delta P = \frac{P_0 \Delta V}{V_0 + \Delta V} \quad \text{Eq. (10)}$$

Utilizing Equations (8)-(10), the pressure change of the cavity for a bilayer doming system upon actuation can be predicted. It can be seen that the expansion difference $\varepsilon_m$ (r) between the two layers plays a dominant role in determining the pressure change.

To determine the expansion $\varepsilon_m$ along the radial direction in the doming actuator, the digital image correlation (DIC) is used to track the expansion of the top layer and thus quantify $\varepsilon_m$ as a function of r upon inflation. FIG. 9C show the DIC image on the radial strain contour of the top-view doming actuator, where the measured expansion coefficient as a function of the radial position upon 4 mL air inflation is plotted in FIG. 9D. The measurement shows that $\varepsilon_m$ varies significantly along the radial direction despite the constant height of the channel, where the expansion rate increases nonlinearly from 0 in the center to arrive its peak at r/R≈0.8, and then decreases to ~0 at the edge of the actuator. After substituting the fitted experimental curve of $\varepsilon_m$ into Equations (8) and (9) (red dashed line expressed by $\varepsilon_m = -0.75\tilde{r}^3 + 0.817\tilde{r}^2 - 0.05\ \tilde{r} + 0.005$ with $\tilde{r} = r/-R$), the theoretical volume change of the doming actuator upon actuation can be predicted as $\Delta V/V_o = 0.16$, which agrees very well with the measured volume change upon 4 mL inflation: $\Delta V/V_o = 0.14 \pm 0.02$ despite the simplified model.

Effect of the Geometric Parameters on Adhesion

Figure 10A:
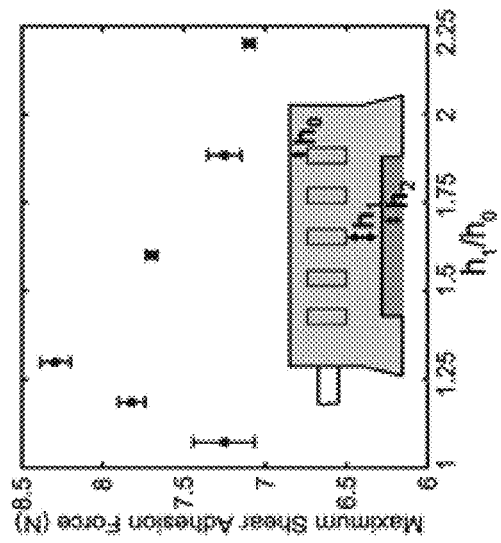
FIG. 10A depicts a schematic of shear adhesion test of the doming actuator.
Figure 10B:
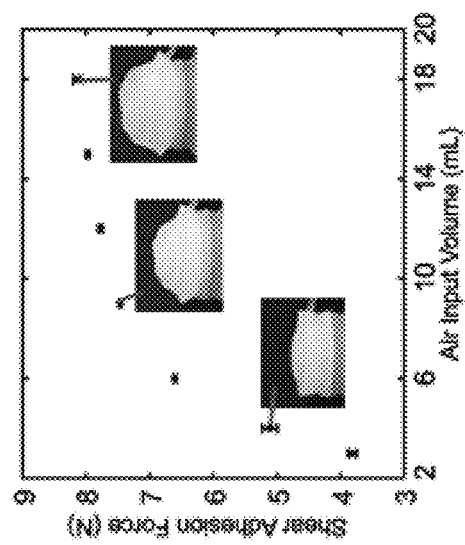
FIG. 10B depicts the measured shear adhesion force as a function of the input air volume.

The pneumatic doming actuator itself is a complicated system and its adhesion behavior is determined by a couple of characterized geometric parameters. In this research, among them, three major parameters are focused upon that govern the doming deformation of a doming actuator with a given radius R and air channel size, namely, the layer thickness $h_1$ between the spiral channel and the cavity and the height of the cavity $h_2$ (FIG. 8C), which mainly determine the deformation governed volume change in the cavity, and the "density" of the spiral channel for a high expansion by manipulating the distance between the channel. The strength of the doming actuator is quantified by measuring the maximum shear adhesion force $S_{max}$ through pure shear testing as schematically illustrated in FIG. 10A. $S_{max}$ is defined as the critical pull-off shear force to detach or slide along the substrate surface. FIG. 10B shows the result of the measured $S_{max}$ of the soft doming actuator on a smooth acrylic surface as a function of the volume of input air into the spiral pneumatic channel. As the volume of inflated air increases, the soft doming actuator deforms gradually into a dome shape with an increasing dome height. The measured maximum shear adhesion first increases monotonically and then approach a plateau with an actuation pressure of 62 kPa. In the following experimental test, the measurement of the shear adhesion force is conducted by attaching the actuator to the same smooth acrylic surface at the same actuation pressure of around 62 kPa.

Figure 10C:
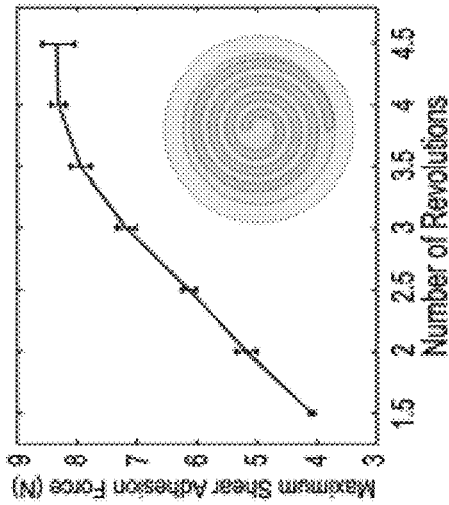
FIG. 10C and FIG. 10D depict the measured maximum shear adhesion force (pressurized at 62 kPa) attached to acrylic surfaces by varying $h_1/h_0$ ($h_2$=2.7 mm) and $h_2$ ($h_1/h_0$=1.35) as illustrated in FIG. 8C.

The results of the parametric studies (FIG. 10C through FIG. 10F) show that to achieve both a high and robust adhesion force, a moderate value of $h_1/h_0$ and $h_2$, as well as a relatively higher number of revolutions in the spiral pneumatic channel is recommended. When $h_2=2.7$ mm is fixed, FIG. 10C shows that as $h_1/h_0$ ($h_1/h_0 \geq 1$) increases, $S_{max}$ increases first and arrives at its peak value at $h_1/h_0=1.35$, then it decreases with further increase of $h_1/h_0$. It is reasonable that when $h_1/h_0$ is relatively small and close to 1, upon pressurization, the deformation in the bilayer structure is dominated by the structural radial expansion rather tha doming, leading to a small out-of-plane doming height $u_z$, as evidenced by Equation (8), thus a weak adhesion. However, when $h_1/h_0$ becomes relatively large, it will require more inflation to bend the thicker envelope of the cavity. Similarly, it will also result in a weak adhesion due to the relatively increased bending stiffness of the bottom cavity structure. Thus, in the following, $h_1/h_0=1.35$ was chosen for the doming actuator due to its exhibited largest shear adhesion force.

Figure 10D:
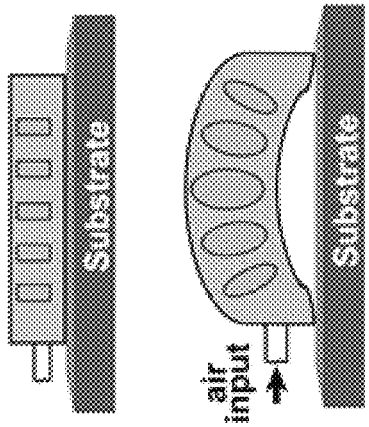
Figure 10E:
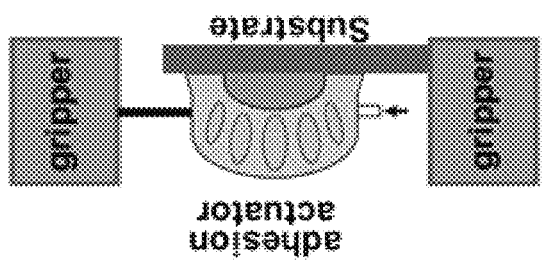
FIG. 10E depicts a schematic of the doming actuator without cavity underneath the channel (i.e. $h_2$=0), showing less contact with the substrate upon pressurization.

Regarding the effect of the cavity volume, FIG. 10D shows that a smaller cavity volume (small $h_2$) leads to a larger shear adhesion force while keeping other parameters constant. It can be explained as below: it was assumed that the volume change ($\Delta V$) of the cavity is mainly determined by $h_0$ and $h_1$ rather than $h_2$. A relatively smaller initial cavity volume ($V_o$) produces a larger value of $\Delta V/V_o$, thus a larger pressure difference $\Delta P$ in terms of Equation (10) and a higher $S_{max}$. It was found that the strongest adhesion is achieved by setting the actuator without a cavity on the bottom, that is, $h_2=0$. Despite the strongest adhesion, a potential issue of unstable contact with the target surface exists for the case without a cavity. It was observed that upon actuation, this noncavity-based doming actuator has less contact with the substrate (FIG. 10E) when compared to those with a relatively larger cavity space, which makes it difficult to firmly conform to the substrate surface, especially on semi-smooth surfaces, thus it becomes more susceptible to potential air leaking. Therefore, a balance between the good conformability of the doming actuator and its adhesion force upon pressurization should be considered for the design of climbing soft robots (here $h_2=2.7$ mm was chosen for a good balance).

Figure 10F:
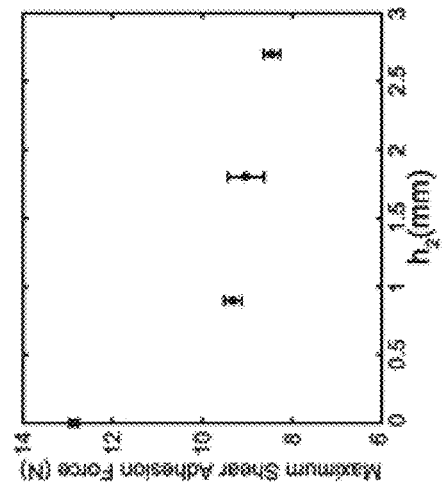
FIG. 10F depicts the maximum shear adhesion force (pressurized at 62 kPa) vs. the number of revolutions of the spiral structure in a unit volume (yellow)/

Similarly, to achieve a high adhesion force, the "density" of the spiral channel can be increased. Here the "density" of the spiral channel is defined as the ratio of the volume that the spiral channel occupies with respect to the volume of the doming actuator. Since this "density" can be determined by multiple geometric parameters, for simplicity, here mainly the number of revolutions was varied for the spiral channel within the same unit volume (indicated by yellow in the inset of FIG. 10F) by tuning the distance between the spiral while keeping other geometrical parameters unchanged. FIG. 10F shows that, upon the same actuation condition (62 kPa), as the number of revolutions increases, the maximum shear adhesion increases monotonically and then approach a plateau. Thus, a relatively larger number of four revolutions is chosen for the spiral shape to ensure the good adhesion performance of the doming actuator in the following.

Amphibious Climbing Soft Robot

Equipped with the information of designing the doming actuator with high and robust adhesion forces, the doming actuator was used to design an amphibious climbing soft robot (ACSR) by combining with a soft bending actuator for locomotion on ground and under water.

FIG. 4A schematically shows the bioinspired design of the ACSR by mimicking the locomotion of an inchworm (Wang W et al., Bioinspiration & biomimetics, 2014, 9(4): 046006). The fabricated ACSR under an actuated and bended state is shown in FIG. 4B. Similar to an inchworm, ACSR consists of three actuation parts (FIG. 4A): two doming actuators on both ends mimicking the head and tail of an inchworm, which enables a strong switchable adhesion force required for attaching and detaching on target surfaces as discussed above; one classic pneumatic bending actuator (Shepherd R F et al., Proceedings of the national academy of sciences, 2011, 108(51):20400-20403; Mosadegh B et al., Advanced functional materials, 2014, 24(15):2163-2170) in the middle to mimic the inchworm's bendable soft body for the locomotion purpose. It has embedded rectangular wave-like pneumatic channels in the hyperelastic elastomer (highlighted in blue in FIG. 4B) and bonded with a strain-limiting layer (highlighted in gold color in FIG. 4B, card stock paper) on its bottom. Combined with the doming actuator, the bending actuator will drive the locomotion of the soft machine via bending/unbending its soft body upon pressurization/depressurization.

In addition to the three actuators, a hard polylactide plastic slider (FIG. 4B) is built to connect the two doming actuators. The connector will allow the two doming actuators to translate and move freely along the slider within the same plane only. Meanwhile, it will constrain their possible rotation movement to prevent their detachment or fall from the target surface, especially for climbing vertical surfaces. Thus, the slider will force the two doming actuators to firmly contact the substrate during the walking and climbing locomotion. Furthermore, the slider plays another role as a hard skeleton, providing the soft machine with enough support and stability.

By pneumatically actuating the three actuators in sequence with a pneumatic control system, both the walking (FIG. 4D) and climbing (FIG. 5) modes of the designed soft machine are demonstrated on a smooth and dry surface (e.g., an acrylic plate) with a certain load-carrying capability. One cycle of the locomotion of the ACSR involves five sequential steps. First, its "head" is pressurized (~62 kPa) to adhere to the target surface (FIG. 4D(i), FIG. 5(a)). Second, its soft "body" is then activated and becomes bended by pressurization (~100 kPa) to move its "tail" and pull the carried load forward (horizontal surface, FIG. 4D(ii)) or upward (vertical surface, FIG. 5(b)) for a load-carrying locomotion. Third, its "tail" is actuated through pressurization (~62 kPa) to attach to the substrate, which will help to hold the carried load (FIG. 4D(iii), FIG. 5(c)). Fourth, the "head" is switched to an adhesion-off state by depressurization to release the adhesion (FIG. 4D(iv), FIG. 5(d)). Last, the soft "body" is depressurized to unbend and to release the stored bending energy to push its adhesion-off-state "head" to move forward along the slider (FIG. 4D(v), FIG. 5(e)). Simply repeating the sequential steps above can achieve an effective locomotion with a large translation distance (after one cycle, the soft robot can move a distance of about 38 mm. The locomotion speed is about 286 mm/min). The motion of the soft machine can be actively tuned and controlled by varying the pneumatic pressurization and adjusting geometric parameters of the slider.

Figure 5:
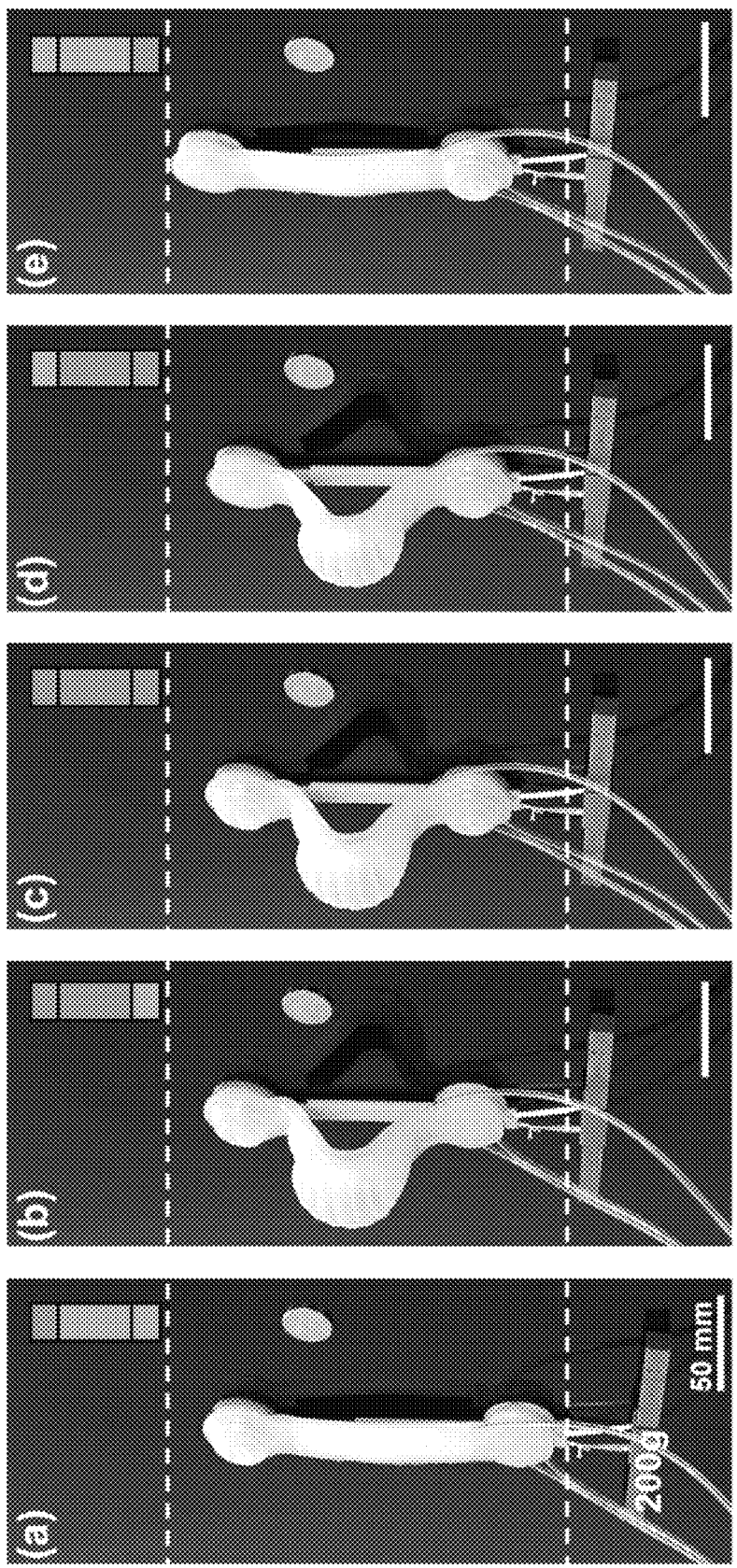
FIG. 5 depicts an exemplary climbing soft robot on a vertical dry and smooth surface carrying a load through 5 sequential steps of actuating both doming and bending actuators in one cycle for vertical climbing on a surface.

Compared to previously reported soft machines (Kim S et al., IEEE Transactions on robotics, 2008, 24(1):65-74), one of the advantages of the proposed soft robot is that it can carry more loads with the help of the doming actuator. For example, on a horizontal flat surface (FIG. 4D), the robot can drag a 350 g steel bar (wheels were not used to decrease the friction) or even heavier object forward. When the soft robot climbs on a vertical surface (acrylics), it can easily lift up a 200 g steel bar (FIG. 5).

Climbing Soft Robots on Multiple Types of Surfaces

Figure 11:
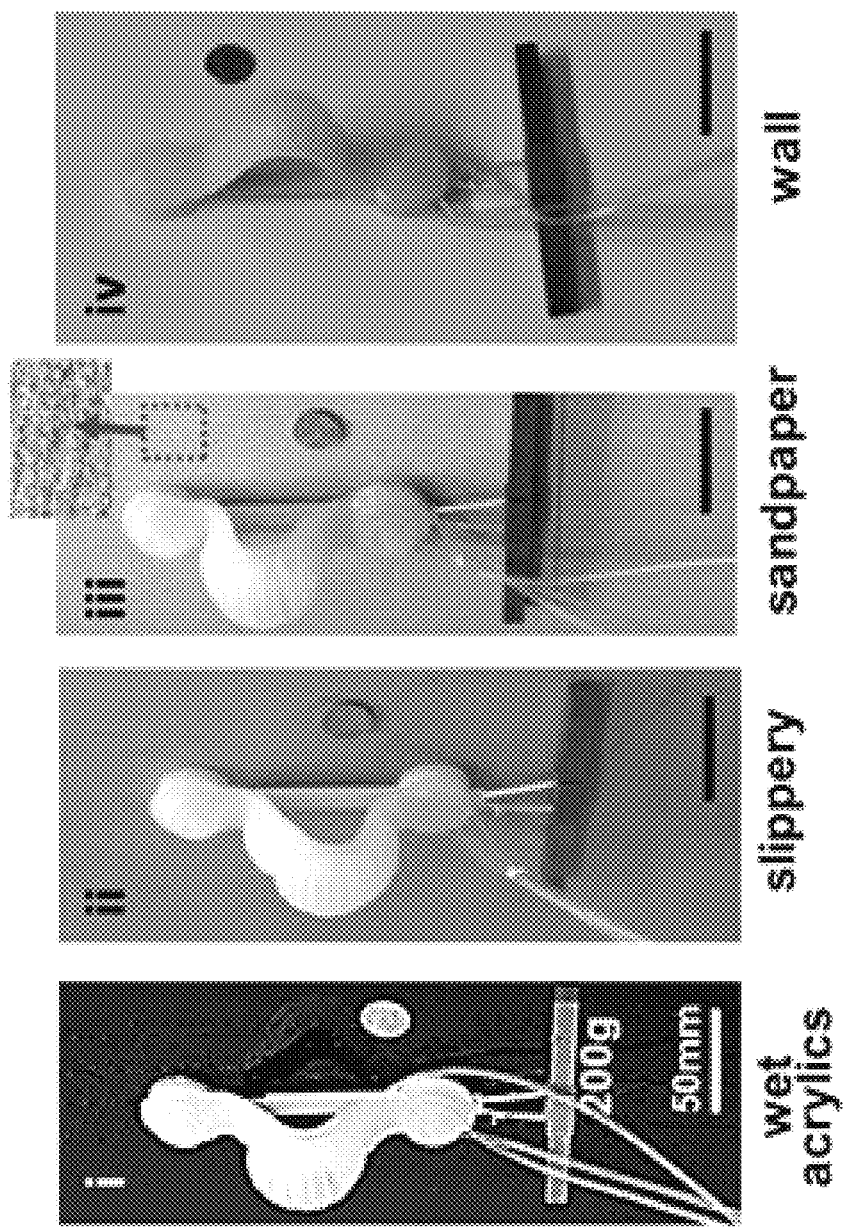
FIG. 11 depicts a demonstration of the soft robot's wide capability of climbing on different types of vertical surfaces with a carried 200 g load, (i) wet acrylics, (ii) lubricated slippery acrylics, (iii) semi-rough sandpaper, (iv) interior painted wall.

In addition to its climbing on smooth and dry surfaces (e.g., the acrylic sheet), its climbing capability on multiple different types of surfaces was further examined, including semi-rough surfaces (e.g., rough sandpaper and indoor painted wall) and wet or slippery lubricated surfaces. The demonstrated proof-of-concept show that the proposed climbing soft robot can even carry a load of 200 g to climb on a variety of surfaces, including dry, wet, slippery, and semi-rough surfaces (FIG. 11).

The maximum load-carrying capacity of the soft climbing machine is mainly determined by the maximum shear adhesion force $S_{max}$ of the doming actuator. To better understand its load-carrying capacity and climbing capability, the measurements were taken of the generated maximum shear adhesion force Smax on various surfaces, including acrylics, glass, steel, and paper. All the measurements were conducted under the same actuation pressure of 62 kPa with a corresponding pressure of ~0.476 atm inside the cavity. The measurement results (FIG. 6B) show that different types of the substrate materials do not significantly affect the maximum adhesion force that the doming actuator can generate. The measured adhesion force ranges from about 6 to 8 N on all the measured dry and smooth substrates, indicating a strong loading capacity of carrying objects that are 60-80 times the weight of doming actuator itself (10 g) on vertical smooth surfaces.

For wet surfaces, experimental result shows that the shear adhesion force of the doming actuator on wet acrylics (*6.96 N) is slightly smaller than that on dry acrylics (7.97 N), thus, it can still function under more challenging circumstance, for example, outdoor performance during the rainy days. For slippery surfaces, such as acrylics surfaces sprayed with lubrication liquid (PVA Release Film; Fiber Glast Development Corporation), the measured maximum shear adhesion force shows a much larger error deviation, which is mainly attributed to the amount of lubrication liquid sprayed on the surface. For a tested acrylics surface (surface area=64 cm$^2$) sprayed uniformly with 0.4 g lubrication liquid, Smax is measured to be 6.23 N, which is close to its performance on dry acrylics. The exhibited strong adhesion of the proposed doming actuator accounts for the soft robot's climbing on wet and even slippery surfaces, which remains very challenging for conventional locomotive soft robots without doming actuator due to their low surface friction.

Next, the possibility of the soft robot's climbing on semismooth surfaces is further examined. Here, semismooth surfaces are defined as lightly rough surfaces with the roughness amplitude (arithmetical mean height $S_a$) smaller than 20 μm. As a proof of concept, a lightly rough sandpaper was used (grit number=180, $S_a$=17.43 μm; Norton) as the targeted climbing semi-smooth surface. The maximum shear adhesion force of the doming actuator on the sandpaper is measured to be 8.95 N, which is even larger than those on smooth surfaces after the bottom surface treatment of the doming actuator. This enhanced adhesion is due to the relatively larger friction of semi-smooth surfaces compared to that of smooth surfaces. With this strong adhesion, the climbing of the soft robot was successfully demonstrated on semismooth surfaces, including both sandpaper (FIG. 11(iii)) and indoor decoration painting wall carrying a load of 200 g. It should be noted that to promote their contact and adhesion to the semi-smooth climbing surfaces, some treatment was used to flatten the bottom surface of the doming actuators. This flatten-treatment is necessary and required, especially for climbing on semi-smooth substrates since it can increase the direct contact (Fuller K N G et al., Journal of Physics D: Applied Physics, 1981, 14(2):221; Briggs G A D et al., Journal of Physics D: Applied Physics, 1977, 10(18):2453) of the bottoms of doming actuators on a target surface. Thus, it can prevent air leaking and increase the conformability of the doming actuator on foreign surfaces, and increase the friction between the soft machine and the substrates.

Climbing and Walking Under Water

Last, the potential application of the soft doming actuator to design underwater walking and climbing soft robots was demonstrated. The maximum shear adhesion force of the doming actuator on a glass surface under water is measured to be ~10.62 N when subjected to 62 kPa pressurization, which is even larger than its dry adhesion of ~7.51 N on glass surface in air. The reason for the larger adhesion under water may be due to the fact that the increase in the cavity volume will pull the water inside in tension, resulting in a decrease in the internal water pressure (Kier W M et al., Integrative and Comparative Biology, 2002, 42(6):1146-1153; Sareh S et al., Journal of the Royal Society Interface, 2017, 14(135):20170395). This pressure drop in liquid may generate a larger pressure difference between the ambient and the cavity when compared to the actuator working on ground, thus leading to a firmer attachment of the doming actuator. With this improved adhesion, it was successfully demonstrated that the soft robot can walk (FIG. 7B) and climb (FIG. 7C) smoothly under water (limited to smooth surfaces) on the glass surface with a certain amount of loading capability.

In conclusion, a bioinspired simple, novel proof-of-concept amphibious soft robot was designed that can walk horizontally and climb vertically on different types of smooth, semi-smooth, dry, wet, or slippery substrates with a certain load-carrying capability on ground and under water. The success lies in the new design of soft doming actuators with embedded spiral pneumatic channels for switchable, strong, and mechanically robust adhesion on different types of surfaces upon pressurization. The soft doming actuator provides a new platform for designing soft robots that can operate on vertical surfaces and work under water, which could find potential applications in design of switchable adhesion materials, object transportation (Tolley M T et al., Soft robotics, 2014, 1(3):213-223), wall-cleaning (Zhang H et al., IEEE Robotics & Automation Magazine, 2006, 13(1): 32-41), camouflage machine (Morin S A et al., Science, 2012, 337(6096):828-832), and underwater soft machines, etc.

Example 3: Design of Multifunctional Soft Doming Actuator for Soft Machines

The design of soft actuators, a key part in soft robotics for deformation actuation, has recently attracted tremendous research interest due to their broad applications in programmable locomotion (Shepherd R F et al., Proceedings of the national academy of sciences, 2011, 108(51):20400-20403; Tolley M T et al., Soft robotics, 2014, 1(3):213-223), artificial muscles (Yang D et al., Advanced Materials Technologies, 2016, 1(3); Yang D et al., Advanced Materials Technologies, 2017, 2(1)), and soft grippers (Shepherd R F et al., Proceedings of the national academy of sciences, 2011, 108(51):20400-20403; Glick P et al., IEEE Robotics and Automation Letters, 2018; Galloway K C et al., Soft robotics, 2016, 3(1):23-33). A variety of soft actuators have been designed and fabricated to achieve different deformation modes including contraction/expansion (Seok S et al., IEEE/ASME Transactions on mechatronics, 2013, 18(5):1485-1497; Seok S et al., Robotics and Automation (ICRA), 2010), twisting (Rogoz M et al., Advanced Optical Materials, 2016, 4(11):1689-1694; Boxerbaum A S et al., The international journal of Robotics Research, 2012, 31(3):302-318; Nasab A M et al., Soft robotics, 2017, 4(4):411-420), rotation (Ainla A et al., Soft robotics, 2017, 4(3):297-304; Yang D et al., Advanced Materials, 2015, 27(41):6323-6327), and bending (Mosadegh B et al., Advanced functional materials, 2014, 24(15):2163-2170; Martinez R V et al., Advanced Materials, 2013, 25(2):153-153). Among them, bilayer bending based soft actuators are widely used for bending deformation actuation. The bilayer soft actuator is often constructed by bonding a strain-limiting layer to stimuli-responsive expanding structures. When in response to external stimuli such as pneumatic/hydraulic pressure (Shepherd R F et al., Proceedings of the national academy of sciences, 2011, 108(51):20400-20403), light (Rogoz M et al., Advanced Optical Materials, 2016, 4(11):1689-1694), humidity (Shin B et al., Science Robotics, 2018, 3(14):eaar2629), electrical (Seok S et al., IEEE/ASME Transactions on mechatronics, 2013, 18(5):1485-1497) and magnetic field (Hu W et al., Nature, 2018, 554(7690):81), mismatched deformation generated in the bilayer structure will lead to the bending of the actuator. These bending actuators have been widely utilized to build functional soft robotics with capabilities of object manipulation (Glick P et al., IEEE Robotics and Automation Letters, 2018; Galloway K C et al., Soft robotics, 2016, 3(1):23-33; Yap H K et al., Soft Robotics, 2016, 3(3):144-158), locomotion (Tolley M T et al., Soft robotics, 2014, 1(3):213-223; Marchese A D et al., Soft Robotics, 2014, 1(1):75-87; Morin S A et al., Science, 2012, 337(6096):828-832), and assisting rehabilitation (Polygerinos P et al., Robotics and Autonomous Systems, 2015, 73:135-143; Polygerinos P et al., Rehabilitation Robotics (ICORR), 2015).

Despite the advance, the deformation in most of the soft bilayer bending actuators is limited to the bending in one direction while leaving the other orthogonal direction unbent, thus the deformed configuration often takes an open shape with zero Gaussian curvature after actuation, which may limit their applications to certain situations when enclosed actuated configurations with nonzero Gaussian curvature such as a dome-like shape are needed. When bending in both orthogonal directions is allowed, it is known that a circular bilayer plate can bend or buckle into a dome-like shape with positive Gaussian curvature upon mismatched deformation between the two layers (Feng, Xue, et al. "The effect of thin film/substrate radii on the Stoney formula for thin film/substrate subjected to non-uniform axisymmetric misfit strain and temperature." Journal of Mechanics of Materials and Structures 1.6 (2006): 1041-1053; Huang Y et al., Journal of the Mechanics and Physics of Solids, 2005, 53(11):2483-2500; Freund L B et al., Applied Physics Letters, 1999, 74(14):1987-1989; Freund L B, Journal of the Mechanics and Physics of Solids, 2000, 48(6-7):1159-1174; Pezzulla M et al., Soft Matter, 2016, 12(19):4435-4442). Similar dome-like shapes are often found in undersea animals. For example, a jellyfish bends its dome-shaped soft body for locomotion under the sea, where bending deformation expulses the water inside the dome to propel itself forward through contracting and relaxing the muscles around the dome (Gemmell B J et al., Proceedings of the National Academy of Sciences, 2013, 110(44):17904-17909; Shintake J et al., Intelligent Robots and Systems (IROS), 2016). Another example is the dome-like suction cups on the arms of octopuses for gripping and moving around through muscle contraction to generate negative pressure inside the chamber (Lee H et al., Advanced Materials, 2016, 28(34):7457-7465; Kumar K et al., Soft robotics, 2017, 4(4):317-323). However, the potential applications of dome-like bending actuators in design of soft machines remains largely unexplored.

The present studies proposes a new soft doming actuator consisting of patterned pneumatic channels on top and strain-limiting layer underneath. Upon pneumatic actuation, the bilayer circular planar structure can reversibly bend into a 3D dome-like shape. Based on the simplified bilayer bending model of circular plates, the mechanics-guided design of controllable deformation is explored in a soft doming actuator for its potential multifunctional applications in soft robotics (Feng, Xue, et al. "The effect of thin film/substrate radii on the Stoney formula for thin film/substrate subjected to non-uniform axisymmetric misfit strain and temperature." Journal of Mechanics of Materials and Structures 1.6 (2006): 1041-1053; Huang Y et al., Journal of the Mechanics and Physics of Solids, 2005, 53(11):2483-2500; Freund L B et al., Applied Physics Letters, 1999, 74(14):1987-1989; Freund L B, Journal of the Mechanics and Physics of Solids, 2000, 48(6-7):1159-1174; Pezzulla M et al., Soft Matter, 2016, 12(19):4435-4442).

The materials and methods are now described.

Actuator Fabrication

All pneumatic doming actuators were fabricated following the typical manufacturing technique for fluid-driven soft actuators previously reported (Shepherd R F et al., Proceedings of the national academy of sciences, 2011, 108(51): 20400-20403). Ecoflex 00-50 (Smooth-on Inc.) was used for both pneumatic channeled layer and the strain limiting layer. The two layers were directly cast from molds printed by Ultimaker 2+ separately and were cured at 70° C. for 2 h. Then the two layers were glued together with Ecoflex 00-50 and cure them at 70° C. for another 1 h.

Adhesion Measurement

The normal adhesion force of the doming actuator was measured using Instron 5944 with a 2 kN load cell. The soft actuators were pressurized at 40 kPa and the extension rate of the Instron was 1 mm min$^{-1}$. For all the measurements including adhesion force, expansion rate, and doming angle, at least 10 data points are collected for each measurement for ensuring the repeatability.

DIC Characterization

Speckles were sprayed on the top surface of the soft actuator using an airbrush and India ink for DIC measurement. Images of the testing were taken at a rate of 1 fps (VicSnap, Correlated Solution) and DIC (Vic-2D, Correlated Solution) was used to track the deformation and obtain local strain contours.

The results are now described.

The Design of a Bilayer Doming Actuator for Multifunctionality

Figure 12A:
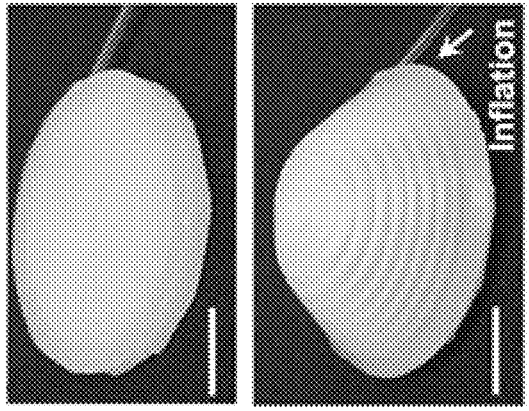
FIG. 12A through FIG. 12E depict a design of multifunctional soft doming actuators.
Figure 12B:
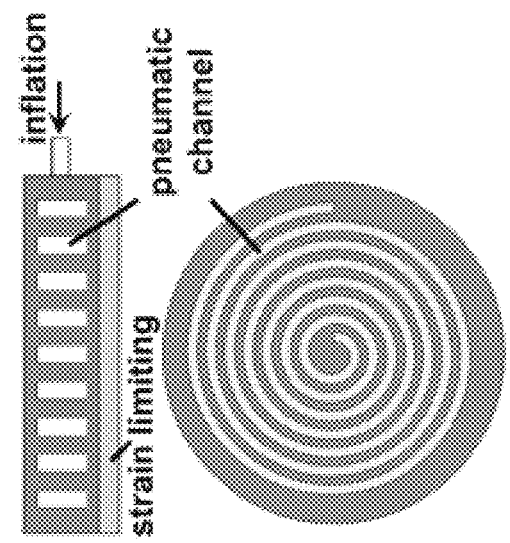

As schematically illustrated in FIG. 12A, the proposed soft doming actuator is composed of a circular bilayer system with embedded patterned pneumatic spiral channel on the top layer (blue color) and elastomeric layer underneath (yellow color) for strain-limiting purpose. The actuator is made of soft silicone rubber, Ecoflex 00-50 (Smooth-on Inc) (top of FIG. 12B). Upon inflating air into the spiral pneumatic channel, the top-layer expansion along the radial direction renders a mismatched deformation between the top and the bottom layer, thus forms a 3D dome-like shape (bottom of FIG. 12B). After depressurization, the dome shape returns to its planar bilayer structure.

Figure 12C:
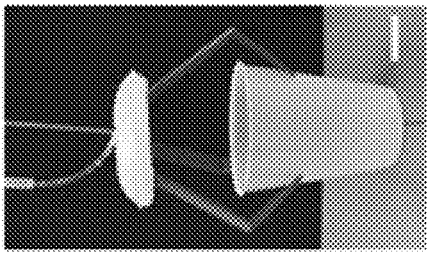
Figure 12D:
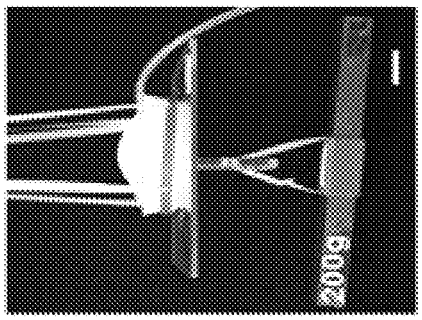
Figure 12E:
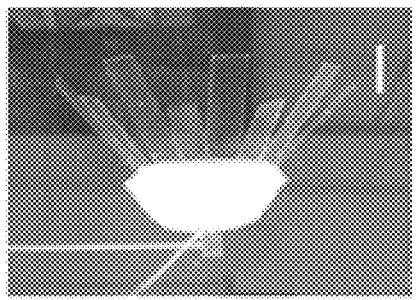

Guided by the simplified bending model of linear elastic circular-shaped bilayer structures with non-uniform axisymmetric mismatched strain, the controllable deformation was demonstrated in the soft doming actuator to achieve either large cavity volume or large bending angle at its rim, as well as its potential applications for multifunctional soft machines, including bioinspired design of a jellyfish-like soft underwater robot with high locomotion velocity (FIG. 12C), a soft doming actuator with strong and switchable adhesion force (FIG. 12D), as well as a soft gripper with low energy cost (FIG. 12E).

Simplified Theoretical Modeling

To shed some light on the design of bilayer-doming based soft robotics, a simplified bilayer model was employed with non-uniform axisymmetric mismatched expansion between two layers to understand the deformation of the bilayer doming structure, particularly the dome height and volume for design of doming actuator, and the bending angle at the rim for design of underwater swimmers with high thrust force and rotation-based soft grippers.

For a bilayer system composed of a circular thin film (thickness of $h_f$) on a substrate (thickness of $h_s$) with radius of R as shown in FIG. 13A ($h_f \ll h_s$), when it is subjected to a non-uniform but axisymmetric misfit strain $\varepsilon_m(r)$ along the radial direction r, the height $u_z$ of the deformed dome structure along the normal direction z-axis can be obtained as (Huang Y et al., Journal of the Mechanics of Solids, 2005, 53(11):2483-2500):

$$\frac{du_z}{dr} = 6\frac{E_f h_f}{1-v_f^2}\frac{1-v_s^2}{E_s h_s^2}\left[(1+v_s)\frac{1}{r}\int_0^r \eta\varepsilon_m(\eta)d\eta + (1+v_f)\frac{1-v_s}{1+v_s}\frac{r}{R^2}\int_0^R \eta\varepsilon_m(\eta)d\eta\right] \quad \text{Eq. (11)}$$

where E and v are the Young's modulus and Poisson's ratio. The subscripts "f" and "s" represent the film and substrate, respectively. r is defined as the radial distance from the center. The slope or bending angle of the dome at the rim, which is call the "doming angle" $\phi$ in FIG. 13B, can be obtained as:

$$\phi = \frac{du_z}{dr}(R) = 6\frac{E_f h_f}{1-v_f^2}\frac{1-v_s^2}{E_s h_s^2}\left[(1+v_s)\frac{1}{R}\int_0^R \eta\varepsilon_m(\eta)d\eta + (1+v_f)\frac{1-v_s}{1+v_s}\frac{1}{R}\int_0^R \eta\varepsilon_m(\eta)d\eta\right] \quad \text{Eq. (12)}$$

Integrating Equation (11) with respect to r obtains the dome height $u_z$:

$$u_z = 6\frac{E_f h_f}{1-v_f^2}\frac{1-v_s^2}{E_s h_s^2}\left[(1+v_s)\int_0^r \frac{1}{r}\int_0^R \eta\varepsilon_m(\eta)d\eta dr + (1+v_f)\frac{1-v_s}{1+v_s}\frac{r^2}{2R^2}\int_0^R \eta\varepsilon_m(\eta)d\eta\right] + C \quad \text{Eq. (13)}$$

where C is a constant to be determined by satisfying the assumed boundary condition of $u_z(R)=0$.

It should be noted that when the model is applied to understand the deformation in the doming actuator, it is oversimplified by homogenizing the expanding layer without considering its detailed patterned pneumatic channels, as well as by assuming linear elastic materials behavior in the homogenized continuous layer despite the nonlinear deformation in the elastomer upon pressurization. The misfit strain $\varepsilon_m$ between the two layers is governed by the pneumatic channeled structure, which can be manipulated by controlling the geometry of the spiral channel along the radial direction. After homogenization, it is assumed that $E_f \approx E_s$ and of $v_f \approx v_s$. Equations (12) and (13) show that for a bilayer plate system with given geometry, i.e., normalized layer thickness $h_f/R$ and $h_s/R$, the dome height and rim slope are mainly determined by the axisymmetric misfit strain $\varepsilon_m$ controlled by the channel geometry. In the following sections, based on this simplified model, it is demonstrated that by manipulating the channel height gradient along the radial direction, the non-uniform misfit strain $\varepsilon_m(r)$ can be tuned to allow more expansion either near the center or the rim to achieve large cavity volume or large dome bending angle at the rim in the actuated dome shape. The different features of the deformed dome shapes will be utilized in soft doming actuators to guide the design of multifunctional soft robotics as discussed below.

Swimming Actuator

The reversible switch from flat to dome-like shape in the doming actuator upon pressurization is similar to the deformation of jellyfish body, which inspired the exploration of its potential application in design of jellyfish-like underwater soft robots. The proposed swimming robot is schematically shown in FIG. 14A. It is composed of a pneumatic doming actuator made of soft silicone Ecoflex 00-50 and attached with a few stiff plastic film-based "propellers" to amplify the thrust force under water. FIG. 14B illustrates the representative underwater locomotion modes. At rest state, the soft actuator remains flat and undeformed (left of FIG. 14B). Upon inflation, it bends into a dome shape. The dome contract upon bending expulses water to push the swimmer forward. Meanwhile, the attached "propellers" flap backward correspondingly upon dome bending to generate vortex under water for enhancing the thrust force. Upon deflation, it returns to its flat state. During swimming, for the dome shape with given size, the doming angle at the rim plays a dominant role in determining the thrust force and thus the swimming speed, as evidenced by the locomotion of jellyfishes (Yeom S W et al., Smart materials and structures, 2009, 18(8):085002; Villanueva A et al., Bioinspiration & biomimetics, 2011, 6(3):036004). The high locomotion efficiency in jellyfish results from not only the abrupt muscle contraction (Gemmell B J et al., Proceedings of the National Academy of Sciences, 2013, 110(44):17904-17909), but also from a large bending angle at the rim of its dome-shaped body that can generate larger vortices to propel it forward. Therefore, bioinspired by the performance of the jellyfish, the manipulation of $\varepsilon_m$ (r) is exploited in the doming actuators to achieve a relatively larger doming angle, as well to examine their underwater performance for designing potential fast-speed underwater soft robots.

According to Equation (12), for a bilayer actuator with given geometry, the doming angle $\phi$ is mainly determined by the misfit strain $\varepsilon_m$ (r) along the radial direction, which can be tuned by varying the height of the channel along the radial direction, as shown in FIG. 14C. In general, a deep or high aspect-ratio pneumatic channel yields a larger in-plane expansion than the shallow one. By tuning the height gradient of the pneumatic channel along the radial direction, i.e., the value of the tilting angle $\theta$ defined in FIG. 14C, the non-uniform radial expansion of the pneumatic layer can be manipulated as well as the doming angle $\phi$ at the rim. Here, a negative value of $\theta$, i.e., $\theta<0$, denotes that the channel height decreases linearly from the edge to the center, which presents a larger in-plane expansion close to the edge; a positive $\theta$, i.e., $\theta>0$, indicates an increasing channel height from the edge to the center and presents a larger expansion close to the center; while $\theta=0$ represents a constant channel height in the top layer.

To understand the relationship between $\theta$ and $\varepsilon_m$ (r), the digital image correlation (DIC) was used to track the expansion of the top layer (indicated by blue in FIG. 14C) and thus quantify the value of $\varepsilon_m$ as a function of r upon inflation for doming actuators with different values of $\theta$. In the test, all the samples have the identical geometry (R=38 mm, $h_s$=9 mm, $h_f$=1 mm, $h_c$=5 mm) and are inflated with the same air pressure of 5 kPa. The inset of FIG. 14D shows the measured strain contour through DIC for the dome actuator with $\theta=-1.5°$. It shows that the maximum mismatched strain is within a small strain of less than 20%, thus the small deformation model in Equation (11) holds effective (Freund L B, Journal of the Mechanics and Physics of Solids, 2000, 48(6-7):1159-1174). FIG. 14D shows the measured expansion rate as a function of radial distance r/R for three representative values of $\theta$ (i.e. $\theta=1.5°$, $\theta=0°$, and $\theta=-1.5°$). It shows that for different small value of $\theta$, the radial expansion in both the center and the rim (i.e., r/R=0) of the dome is close to zero, and it exhibits a peak value between them. As $\theta$ decreases from a positive value to a negative one, the position of the peak radial expansion rate shifts from close-to-center to close-to-rim, i.e., more expansion at the rim than in the center, which is consistent with the expectation of the gradient channel height.

Figure 15:
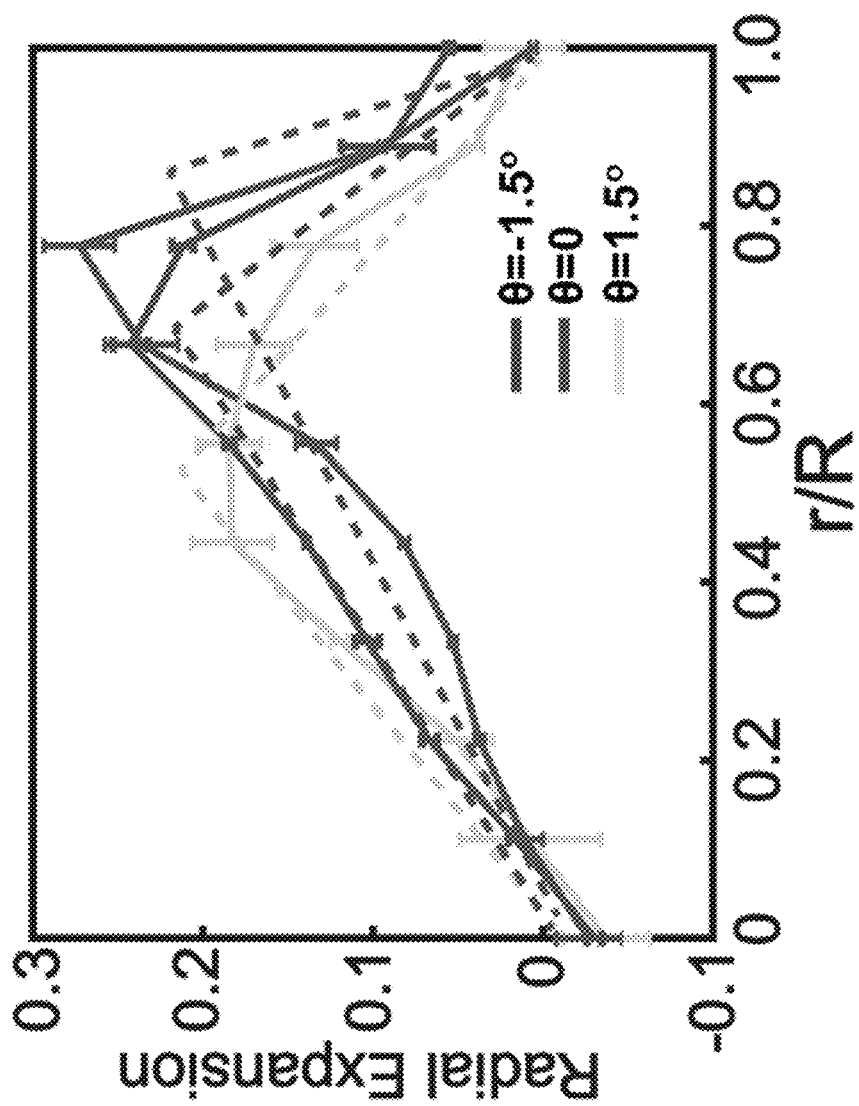
FIG. 15 depicts a graph of the fitting of the DIC measured radial expansion rate of the top layer with channel height gradient of θ=−1.5°, θ=0° and θ=1.5° upon 4 mL inflation.

Equipped with the information of measured $\varepsilon_m(r)$, the corresponding doming angle is evaluated in terms of the theoretical model in Equation (12). After substituting the fitted experimental curves of $\varepsilon_m$ in FIG. 14D into Equation (12) (equations of fitted curves can be found in FIG. 15 description), the theoretical value is obtained for the doming angle $\phi=5.02°$, 4.46°, and 3.90° for $\theta=-1.5°$, 0°, and 1.5°, respectively. It indicates that a negative $\theta$ will contribute to a larger doming angle $\phi$ at the edge when compared to its counterparts with positive $\theta$. This is consistent with the expectation that a negative $\theta$ leads to a larger expansion close to the edge, and thus a larger bending angle at the edge. The results from the theoretical model were then compared with the experiments. It was found that the theoretical value of $\phi$ is moderately lower than the corresponding measured value of $\phi=11°$, 6.7°, and 4.9° for $\theta=-1.5°$, 0°, and 1.5° upon a pressurization of 5 kPa (FIG. 14E). Such a deviation may result from the oversimplified homogenization of the channeled structures, as well as the assumed linear elastic materials model without considering the highly nonlinear materials behavior in the ecoflex. Improved dome bending may be achieved by extending the current small-deformation model to large and highly nonlinear deformation models. Despite the deviation, it can be seen that the trend of increasing $\phi$ with decreasing $\theta$ from a positive to a negative value agrees well with the theoretical prediction. As the input air pressure further increases, the mismatched expansion rate also increases and leads to a monotonic nonlinear increase in the doming angle $\phi$ for all $\theta$ (FIG. 14E). The actuator with a negative value of $\theta$ exhibits a moderately higher $\phi$ than their counterparts with positive and zero value of $\theta$ and such a disparity increases with the expansion rate (FIG. 14E).

Based on the knowledge of controlling the doming angle, the soft doming actuator was utilized to design jellyfish-like underwater soft robots with a relatively high swimming speed. As discussed before, it was expected that a large bending angle at the edge will yield a large thrust force underwater. To validate it, three soft underwater swimmers were built with $\theta=-1.5°$, $\theta=0°$, and $\theta=1.5°$ and tested to measure their respective locomotion speed (FIG. 14F). All the actuators have the same geometry (R=38 mm, $h_s$=9 mm, $h_f$=1 mm, $h_c$=5 mm) and are actuated at the same pressure (30 kPa) and the same average frequency (0.333 Hz). FIG. 14G shows the image snapshots of the actuator taken at 2, 7, and 23 seconds during swimming in the water tunnel. It shows that the actuator with $\theta=-1.5°$ can achieve the fastest average locomotion speed of 84 cm min$^{-1}$ at the average actuation frequency of 0.333 Hz (FIG. 16) with the help of its relatively larger doming angle (FIG. 14E). This is consistent with the expectation that a negative height gradient $\theta$ allows for more expansion around the edge to generate a larger bending angle at the edge and thus a larger thrust force.

It should be noted that despite previous studies of jellyfish-inspired soft robots based on different actuators such as ionic polymer metal composite (Yeom S W et al., Smart materials and structures, 2009, 18(8):085002; Yeom S W et al., Smart materials and structures, 2009, 18(8):085002), shape memory alloy (Villanueva A et al., Bioinspiration & biomimetics, 2011, 6(3):036004; Villanueva A et al., Bioinspiration & biomimetics, 2011, 6(3):036004), and dielectric elastomer (Godaba H et al., IEEE Robotics and Automation Letters, 2016, 1(2):624-631), the proposed swimming robot based on the bilayer doming actuator is simpler in both structures and materials. It does not require complicated manufacturing process to achieve an even higher swimming speed than that of most reported active materials based jellyfish-inspired underwater robots (Yeom S W et al., Smart materials and structures, 2009, 18(8): 085002; Godaba H et al., IEEE Robotics and Automation Letters, 2016, 1(2):624-631) as shown in FIG. 17, which demonstrates its potential advantage in designing fast-speed underwater robots. Furthermore, compared to bending of discrete segments to form a dome-like shape, the uniqueness of the doming actuator lies in the biaxial bending of the whole structure to form a circumferentially enclosed dome shape, thus enables its multifunctionality not only in design of jellyfish-like underwater robots, but also in design of switchable doming actuator and energy-efficient grippers as discussed in the following sections.

Switchable Doming Actuator

In addition to the demonstration as a potential underwater soft robot, the similar dome-like shape in the bilayer doming actuator as the suction cup of octopuses has multifunctionality as a potential doming actuator (Kier W M et al., Integrative and Comparative Biology, 2002, 42(6):1146-1153; Lee H et al., Advanced Materials, 2016, 28(34):7457-7465).

FIG. 18A schematically illustrates the working mechanism as a doming actuator. When attached to a foreign surface, upon pneumatic pressurization on the top layer, the planar circular bilayer structure will continuously "pop up" and deform into a dome-like shape upon radial expansion of the top layer, leaving a cavity with high vacuum between the popped-structure and the attached surface. The pressure difference between the cavity and the outer circumstance will force the actuator to firmly adhere to the target surface. Upon depressurization, the deformed dome-like shape will return to its original planar configuration for easy detachment.

Different from the design principle of achieving a larger doming angle in underwater soft robot discussed above, the goal for designing doming actuators is to achieve a high vacuum in the cavity for a large adhesion force by maximizing the volume of the cavity after deformation. The cavity volume is mainly determined by the dome height $u_z$. Thus, a positive value of channel height gradient $\theta$ is preferred as shown in FIG. 18B. Compared to actuators with negative $\theta$, a positive $\theta$ allows a larger expansion close to the center than at the edge to achieve a larger dome height in the center. Furthermore, as discussed above, as $\theta$ ($\theta>0$) increases, the peak expansion will shift closer to the center, which generally will lead to a larger dome height and thus a larger adhesion force.

To examine the design principle, three doming actuators were fabricated with different values of $\theta$ (i.e., $\theta=0°$, $\theta=1.5°$, and $\theta=3°$) while keeping the other geometrical sizes the same (i.e., R=28 mm, $h_s$=9 mm, $h_f$=3 mm, $h_c$=5 mm). FIG. 18C shows the corresponding measured radial expansion rate from the center to the edge as a function of $\theta$ through DIC under the same air pressure of 5 kPa. It shows that as $\theta$ increases, the peak expansion does shift closer to the center. Similarly, after substituting the fitted curves of the radial expansion rates in FIG. 18C (the equations for fitted curves can be found in FIG. 19) into Equation (13), the theoretically predicted profiles of the deformed dome shape can be obtained for different $\theta$, which is shown in FIG. 18D. It shows that as $\theta$ increases from 0° to 3°, the dome height at the center (r/R=0) increases slightly.

Next, the adhesion strength of the three soft doming actuators were examined with different $\theta$ by measuring the normal adhesion force on a smooth acrylic surface. The adhesion strength of the actuator is quantified by measuring the maximum normal adhesion force through the pulling force testing as illustrated in FIG. 18E. The measured adhesion strength as a function of $\theta$ is shown in FIG. 18F. It shows that the maximum adhesion force increases approximately linearly with $\theta$ and becomes almost doubled as $\theta$ increases from 0° to 3°.

However, such a largely increased adhesion strength with $\theta$ observed in experiments does not agree well with the theoretical model, where a small increase in the adhesion strength with $\theta$ is predicted due to the slightly increased cavity volume. The disparity results from the different deformation mechanisms for open and close bilayer dome structures. For the open bilayer dome actuator without attaching to a surface, i.e., the case of simplified model, the structural deformation is mainly determined by the mismatched expansion of the top layer induced bilayer bending, i.e., a "pop-up" deformation. However, when attaching to a surface, the suction force resulting from the pressure difference is absent in the open dome and not considered in the simplified model. The suction force intends to pull down the "popup" structure, thus generating a potential "bistable" dome structure, depending on the competition between the "pull-up" force arising from the expansion-induced bending and the "pulldown" force arising from the pressure difference in the cavity.

In experiments, the deformation bifurcation is observed in the doming actuator (FIG. 20). As the top layer starts to expand, the bilayer structure initially deforms into an axisymmetric dome-shape. However, as the pressure difference between the cavity and the ambient environment builds up upon further expansion, when beyond certain critical point, bifurcation may occur and break the axial symmetry of the dome structure to generate an asymmetric dome shape as shown in the left inset of FIG. 18F and FIG. 20. This distorted configuration may weaken the adhesion behavior of the soft doming actuator upon further pressurization. It is noted that despite the observed bifurcation in the bistable bilayer doming system, a relatively larger value of height gradient $\theta$ ($\theta>1.5°$), i.e., more radial expansion in the center, can help to delay the bifurcation and hold the axial-symmetric dome-shape configuration even at a large mismatch strain without localized structural collapse, thus to enhance the large adhesion force even at a large actuation pressure of 40 kPa (FIG. 18F and right inset). By contrast, doming actuators with smaller angle (e.g., $\theta=0.45°$, 0.9°, and 1.35°) deform into distorted shapes (left inset of FIG. 18F) and demonstrate smaller adhesion force at the same actuation condition. To better understand the adhesion force generated by a doming actuator, a more comprehensive bilayer model can be developed by considering the large and nonlinear deformation of bilayers, the bifurcation of bilayers, and the coupling of the cavity pressure change with the deformation of the dome shape in the model, etc.

The observed large bending angle at the edge of the bilayer dome structure enables the design of a potential gripping actuator by harnessing the controllable bending-induced rotation of attached gripper arms for object pick-up and drop-off. As discussed above, a larger expansion close to the edge than around the center in the top layer is preferred to achieve a large bending angle φ at the edge. Thus, to further enhance φ for design of gripping actuators, a modified design of an annulus-shaped bilayer plate is proposed as schematically illustrated in FIG. 21A, where the central part of the original solid bilayer plate-based actuator is cut out with a radius of $R_{in}$. Similarly, the top expansion layer is embedded with pneumatic spiral channels of the same height, while the layer underneath (yellow color) does not expand for strain-limiting purpose. The corresponding simplified homogenization bilayer model is shown in FIG. 21B. Compared to its counterpart without cut-out, the annulus-shaped bilayer actuator has two potential benefits: one is to achieve a larger φ by manipulating the size of the cut-out and allowing more expansion shifting to the outer annulus boundary; the other is to reduce the energy cost to realize the same bending angle φ without the need to bend the original top cap region.

To reveal the geometrical effect on the bending angle φ of the annulus bilayer structure, some useful insights can be obtained from the theoretical model on the deformation of annulus bilayer plates with mismatched expansion stain $\varepsilon_m$ between the bilayer. The height uz of the deformed dome structure along the normal direction z-axis can be obtained as:

$$\frac{du_z}{dr} = 6\frac{E_f h_f}{1-v_f^2}\frac{1-v_s^2}{E_s h_s^2}\left[(1+v_s)\frac{1}{r}\int_{R_{in}}^{r}\eta\varepsilon_m(\eta)d\eta\right] + Ar + B \quad \text{Eq. (1)}$$

The value of constants A and B can be obtained through the boundary conditions. Then the doming angle can be obtained as:

$$\phi = \frac{du_z}{dr}(R) = 6\frac{E_f h_f}{1-v_f^2}\frac{1-v_s^2}{E_s h_s^2}\left[(1+v_s)\frac{1}{R}\int_{R_{in}}^{R}\eta\varepsilon_m(\eta)d\eta\right] + AR + B \quad \text{Eq. (14)}$$

By assuming an approximately constant mismatched strain $\varepsilon_m$ in the annulus bilayer actuator with the same channel height, the theoretical prediction of φ for annulus bilayer structures with different size of circular cut-out (i.e., $R_{in}/R$) is plotted in FIG. 22A. It shows that at the same mismatch strain (e.g., $\varepsilon_m$=0.2), the doming angle φ increases almost linearly with $R_{in}/R$, which means that the actuators with a larger cutout radius $R_{in}$ will result in a larger bending angle at its outer boundary. For example, for actuators with $R_{in}/R$=0.5, φ could reach a large value of over 60°.

To validate the model, the modified bilayer doming actuators were built with the same size of the outer radius of R=38 mm but with different cut-out sizes $R_{in}$. The other geometrical sizes are kept the same ($h_s$=9 mm, $h_f$=1 mm, $h_c$=5 mm). Upon the same actuation pressure of 30 kPa, FIG. 22B shows that as $R_{in}/R$ increase from 0 (i.e., no cut-out) to 0.5, correspondingly, φ increases monotonically from 41° to 51°, which is consistent with the model and the expectation that the introduction of cutout to the solid circular bilayer structure can help to enlarge the bending angle at the same actuation pressure.

Based on the improved doming angle of the modified bilayer doming actuator, a simple proof-of-concept soft pneumatic gripper was designed. As illustrated in FIG. 22C, the gripper is composed of an annulus pneumatic bilayer soft actuator with three 3D printed plastic gripping assistors attached to its edge. As the bilayer doming actuator bends up upon pressurization, the attached gripper arms will rotate correspondingly toward the center and close its arms to pick up the object. The proof-of-concept experiment shows that the built gripper actuator ($R_{in}/R$=0.5, R=38 mm, $h_s$=9 mm, $h_f$=1 mm, $h_c$=5 mm) can effectively grasp and release the object (e.g., a plastic cup) by simply pressurizing and depressurizing the pneumatic channel with a small pressure of 30 kPa as shown in FIG. 22D. It should be noted that most previous studies on bilayer bending-based grippers rely directly on the grasping of objects through bending-induced closure of the arms (Glick P et al., IEEE Robotics and Automation Letters, 2018; Galloway K C et al., Soft robotics, 2016, 3(1):23-33; Yap H K et al., Soft Robotics, 2016, 3(3):144-158). However, as discussed before, the working mechanism of the proposed design of doming-based grippers in this work is different, which harnesses the large rotation at the rim during the dome-bending of the annulus to drive the closure of the attached rigid arms, rather than the direct closing of the bended arms. The mechanism of bending induced rotation could be complimentary to the design of gripping actuators (Yang D et al., Advanced Materials, 2015, 27(41):6323-6327).

In summary, it was demonstrated that by controlling the mismatched expansion in a simple circular bilayer system, the generated dome-like structure can yield (i) large-volume cavity and (ii) large doming angle at the edge, which can be utilized to develop multifunctional soft robots with capabilities of swimming, adhesion, and grasping. This study serves as a guideline for designing doming-based soft robots. In addition to the adhesion force, it was found that the output force as a result of the bending deformation in the doming actuator is around 3-3.5 N due to the intrinsic low modulus of the soft elastomers (FIG. 24), which could be enhanced by replacing with relatively stiffer elastomeric materials. It was demonstrated that the design principle of harnessing mismatched deformation for designing doming-based actuators could be applied to not only elastomeric materials such as the silicone rubber in this study or hydrogels actuated by hydraulic pressure, but also other stimuli-responsive materials such as liquid crystals, shape memory polymer, and dielectric elastomers in response to light, heat, and electric field, etc. The doming-based bending actuator could find broad potential applications in design of multifunctional soft machines such as underwater swimmer, climbing soft robots by harnessing the switchable adhesion (Sitti M et al., Robotics and Automation, 2003), jumping soft robots by harnessing the bistable characteristics of the dome structure (Brinkmeyer A et al., International Journal of Solids and Structures, 2012, 49(9):1077-1087), and camouflaging devices utilizing 2D to 3D deformation (Pikul J H et al., Science, 2017, 358(6360):210-214), etc.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A doming actuator device comprising:
   a cylindrical enclosure comprising a top layer having a first thickness, a bottom layer having a second thickness, and a curved wall connecting the top layer to the bottom layer; and an elongate tube positioned within the cylindrical enclosure in a spiral, the elongate tube being bonded to the top layer and to the bottom layer and having an opening suitable for delivery and removal of a gas or liquid into and out of the elongate tube;

wherein the first thickness is thinner than the second thickness.

2. The device of claim 1, wherein the elongate tube comprises a closed end and an open end, the open end being positioned at the opening of the elongate tube.

3. The device of claim 2, wherein the open end is fluidly connected to an external source of gas or liquid.

4. The device of claim 1, wherein the enclosure and the elongate tube are constructed from a flexible, reversibly deformable elastomer.

5. The device of claim 4, wherein the elastomer is silicon.

6. The device of claim 1, wherein the bottom layer comprises one or more attachments.

7. The device of claim 6, wherein the one or more attachments are selected from the group consisting of: fins, fans, flippers, appendages, and hooks.

8. The device of claim 1, wherein the bottom layer comprises a sealing lip forming a perimeter around a central cavity.

9. A soft robot device comprising:
at least one bending actuator comprising a length of material having a top layer and a bottom layer and an elongate lumen embedded within the material for at least a portion of its length, the elongate lumen having an opening suitable for delivery and removal of a gas or liquid into and out of the elongate lumen; and
at least one doming actuator attached to the at least one bending actuator, each doming actuator comprising a cylindrical enclosure comprising a top layer having a first thickness, a bottom layer having a second thickness, and a curved wall connecting the top layer to the bottom layer, and an elongate tube positioned within the cylindrical enclosure in a spiral, the elongate tube being bonded to the top layer and to the bottom layer and having an opening suitable for delivery and removal of a gas or liquid into and out of the elongate tube.

10. The device of claim 9, wherein the elongate tubes of the at least one doming actuator each comprise a closed end and an open end, the open end being positioned at the opening of each elongate tube.

11. The device of claim 10, wherein the open end of each of the elongate tubes is fluidly connected to a source of gas or liquid.

12. The device of claim 9, wherein the elongate lumen is embedded in a zigzag pattern.

13. The device of claim 9, wherein the elongate lumen comprises a closed end and an open end, the open end being positioned at the opening of the elongate lumen.

14. The device of claim 13, wherein the open end is fluidly connected to a source of gas or liquid.

15. The device of claim 9, wherein the at least one bending actuator and the enclosures and elongate tubes of the at least one doming actuator are constructed from a flexible, reversibly deformable elastomer.

16. The device of claim 15, wherein the elastomer is silicon.

17. The device of claim 9, wherein the first thickness of the at least one doming actuator is thinner than the second thickness of the at least one doming actuator.

18. The device of claim 9, wherein the bottom layer of the at least one doming actuator comprises a sealing lip forming a perimeter around a central cavity.

19. The device of claim 9, wherein the top layer of the at least one doming actuator is thinner than the bottom layer of the at least one bending actuator.

20. The device of claim 9, wherein the bottom layer of the at least one bending actuator is bonded to a layer of flexible and non-stretchable material.

21. The device of claim 9, further comprising two interlocking sliding members, each of the two interlocking sliding members connecting two doming actuators.

* * * * *